United States Patent
Ohba et al.

(10) Patent No.: US 10,803,652 B2
(45) Date of Patent: Oct. 13, 2020

(54) IMAGE GENERATING APPARATUS, IMAGE GENERATING METHOD, AND PROGRAM FOR DISPLAYING FIXATION POINT OBJECTS IN A VIRTUAL SPACE

(71) Applicant: SONY INTERACTIVE ENTERTAINMENT INC., Tokyo (JP)

(72) Inventors: Akio Ohba, Kanagawa (JP); Taeko Sanada, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 18 days.

(21) Appl. No.: 16/094,025

(22) PCT Filed: Feb. 13, 2017

(86) PCT No.: PCT/JP2017/005121
§ 371 (c)(1),
(2) Date: Oct. 16, 2018

(87) PCT Pub. No.: WO2017/191700
PCT Pub. Date: Nov. 9, 2017

(65) Prior Publication Data
US 2019/0114823 A1    Apr. 18, 2019

(30) Foreign Application Priority Data
May 2, 2016  (JP) ................................ 2016-092765

(51) Int. Cl.
*G06T 15/20* (2011.01)
*G06T 19/00* (2011.01)
(Continued)

(52) U.S. Cl.
CPC ................ *G06T 15/20* (2013.01); *G06F 3/01* (2013.01); *G06F 3/012* (2013.01); *G06T 19/00* (2013.01);
(Continued)

(58) Field of Classification Search
None
See application file for complete search history.

(56) References Cited

U.S. PATENT DOCUMENTS

2014/0225920 A1*  8/2014 Murata .................... G06F 3/012
                                                           345/633
2015/0355463 A1* 12/2015 Sako ...................... G02B 27/017
                                                           345/633
(Continued)

FOREIGN PATENT DOCUMENTS

JP          11-259686 A    9/1999
JP        H 11-259686 A    9/1999
(Continued)

OTHER PUBLICATIONS

Notification of Reasons for Refusal dispatched Jul. 9, 2019 (3 sheets) with English language translation (6 sheets).
(Continued)

*Primary Examiner* — Patrick F Valdez
(74) *Attorney, Agent, or Firm* — Katten Muchin Rosenman LLP

(57) ABSTRACT

There are provided an image generating apparatus, an image generating method, and a program for generating an image that allows each of the users sharing a virtual space to see what the ether users are looking at. A virtual space managing section (126) arranges a fixation point object indicative of a fixation point at a position away from a first viewpoint in a first visual line direction passing through the first viewpoint arranged in a virtual space, the first visual line direction corresponding to the attitude of a first head-mounted display. A frame image generating section (128) generates an image indicating how things look from a second viewpoint in a second visual line direction corresponding to the attitude of a second head-mounted display, the second viewpoint being arranged in the virtual space in which the fixation point object is arranged.

5 Claims, 21 Drawing Sheets

(51) Int. Cl.
*G06F 3/01* (2006.01)
*G09G 5/08* (2006.01)
(52) U.S. Cl.
CPC .... *G06T 2200/04* (2013.01); *G06T 2219/024* (2013.01); *G06T 2219/028* (2013.01); *G09G 5/08* (2013.01)

(56) References Cited

U.S. PATENT DOCUMENTS

2017/0108922 A1* 4/2017 Terahata ............ H04N 5/23219
2017/0150230 A1* 5/2017 Shimura ............ H04N 21/6156

FOREIGN PATENT DOCUMENTS

| JP | 2002-117415 A | | 4/2002 |
|----|---------------|---|--------|
| JP | 2005-174021 A | | 6/2005 |
| JP | 2005174021 A | * | 6/2005 |
| JP | 2016-35742 A | | 3/2016 |
| JP | 2016035742 A | * | 3/2016 |

OTHER PUBLICATIONS

International Preliminary Report on Patentability dated Nov. 6, 2018, from International Application No. PCT/JP2017/005121, 6 sheets.
International Search Report and Written Opinion dated Apr. 3, 2017, from International Application No. PCT/JP2017/005121, 6 sheets.

* cited by examiner

| USER SYSTEM ID | VIEWPOINT POSITION DATA | VISUAL LINE DIRECTION VECTOR DATA |
|---|---|---|
| 1 | (xa, ya, za) | (Vxa, Vya, Vza) |

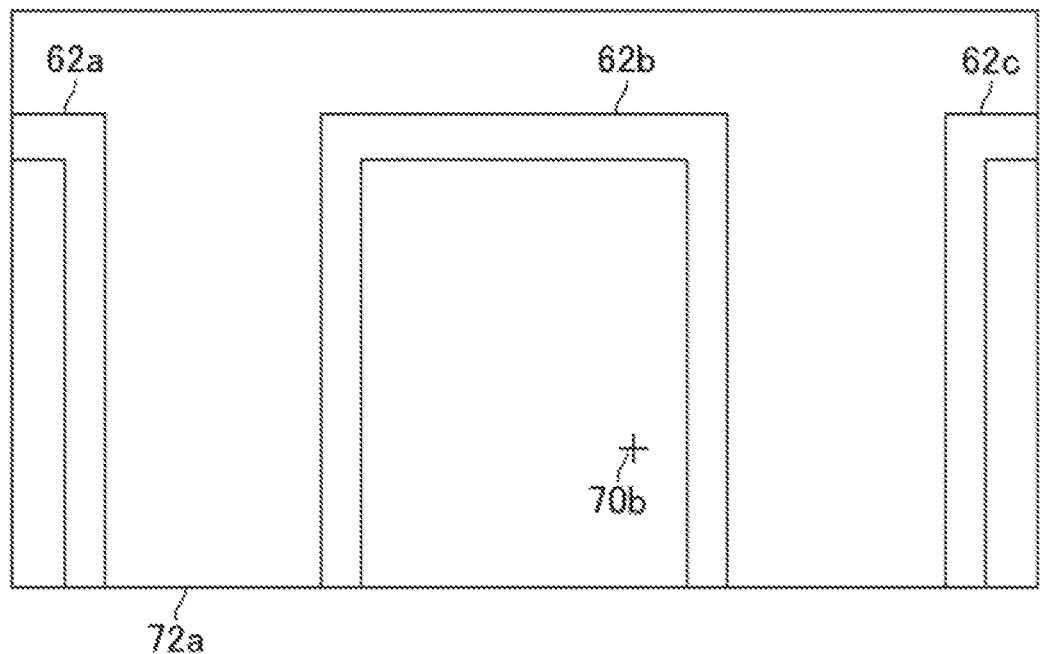

| USER SYSTEM ID | VIEWPOINT INDICATOR POSITION DATA | TEXTURE ID | FIXATION POINT INDICATOR POSITION DATA |
|---|---|---|---|
| 1 | (x1a, y1a, z1a) | 2 | (x2a, y2a) |

| USER SYSTEM ID | VIEWPOINT INDICATOR POSITION DATA | TEXTURE ID | FIXATION POINT INDICATOR POSITION DATA |
|---|---|---|---|
| 2 | (x1b, y1b, z1b) | 2 | (x2b, y2b) |

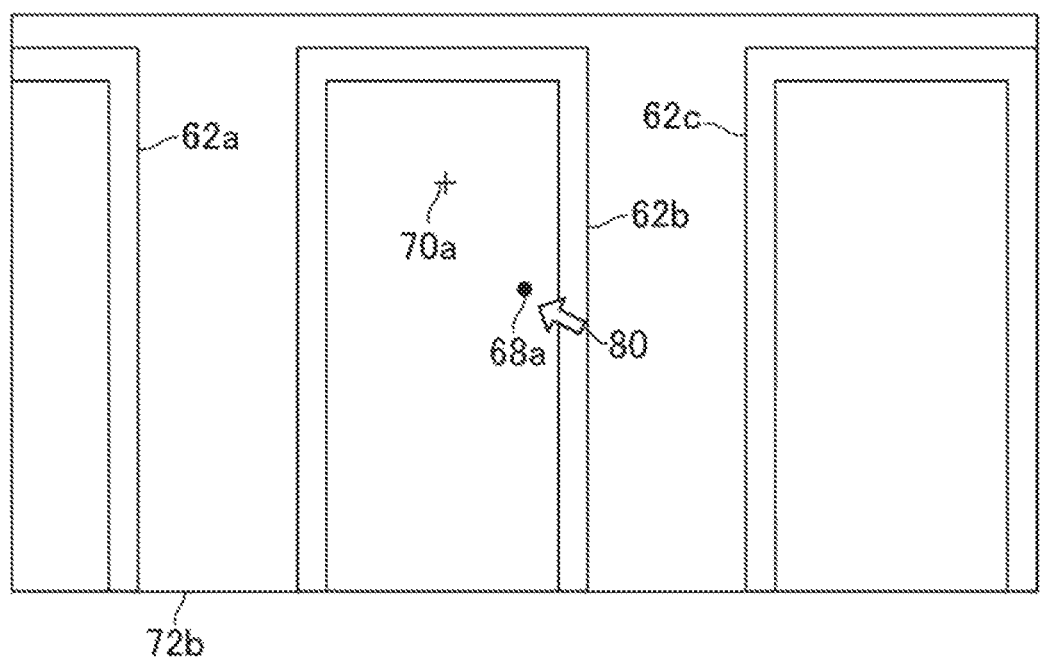

IMAGE GENERATING APPARATUS, IMAGE GENERATING METHOD, AND PROGRAM FOR DISPLAYING FIXATION POINT OBJECTS IN A VIRTUAL SPACE

TECHNICAL FIELD

The present invention relates to an image generating apparatus, an image generating method, and a program.

BACKGROUND ART

There exist head-mounted display (HMD) apparatuses that display how things look when viewed from a viewpoint arranged in a virtual space in a visual line direction. Some of these HMDs allow the visual line direction set in a virtual space to change in keeping with the manner in which the attitude of the HMD is changed.

SUMMARY

Technical Problem

Under consideration at present is how to permit multiple users wearing an HMD each and sharing a virtual apace to communicate with each ether in terms of how these users view the virtual space and what is displayed therein.

In such situations, if an image allows each user to see what the other users are locking at, that image will serve as a basis for smooth communication between the users. However, there has been no technology for generating such images.

The present invention has been made in view of the above circumstances. An object of the invention is to provide an image generating apparatus, an image generating method, and a program for generating an image allowing users sharing a virtual space to see what the other users are looking at.

Solution to Problem

In solving the above problem and according to the present invention, there is provided an image generating apparatus including: a fixation point object arranging section configured to arrange a fixation point object indicative of a fixation point at a position away from a first viewpoint in a first visual line direction passing through the first viewpoint arranged in a virtual space, the first visual line direction corresponding to the attitude of a first head-mounted display; and an image generating section configured to generate an image indicating how things look from a second viewpoint in a second visual line direction corresponding to the attitude of a second head-mounted display, the second viewpoint being at ranged in the virtual space in which the fixation point, object is arranged.

In one embodiment of the present invention, the virtual space may include a virtual object visible by a user wearing the first head-mounted display and by a user wearing the second head-mounted display. The fixation point object arranging section may arrange the fixation point object at an intersection point between the virtual object and a line passing through the first viewpoint in the first visual line direction.

In this embodiment, a two-dimensional image may be mapped to the virtual object. The fixation point object arranging section may arrange the fixation point object on the two-dimensional image.

Also in this embodiment, the fixation point object arranging section may arrange multiple fixation point objects associated with multiple head-mounted displays. The multiple fixation point objects may allow the associated head-mounted displays to be identified.

Also according to the present invention, there is provided an image generating method including: a step of arranging a fixation point object indicative of a fixation point at a position away from a first viewpoint in a first visual line direction passing through the first viewpoint arranged in a virtual space, the first visual line direction corresponding to the attitude of a first head-mounted display; and a step of generating an image indicating how things look from a second viewpoint in a second visual line direction corresponding to the attitude of a second head-mounted display, the second viewpoint being arranged in the virtual space in which the fixation point object is arranged.

Further according to the present invention, there is provided a program for causing a computer to perform: a procedure for arranging a fixation point object indicative of a fixation point at a position away from a first viewpoint in a first visual line direction passing through the first viewpoint arranged in a virtual space, the first visual line direction corresponding to the attitude of a first head-mounted display; and a procedure for generating an image indicating how things look from a second viewpoint in a second visual line direction corresponding to the attitude of a second head-mounted display, the second viewpoint being arranged in the virtual space in which the fixation point object is arranged.

BRIEF DESCRIPTION OF DRAWINGS

FIG. 6B is a tabular diagram listing other typical viewpoint data.

FIG. 7 is a schematic diagram depicting a typical virtual space image.

FIG. 15 is a schematic diagram depicting a typical virtual space image.

FIG. 16 is a tabular diagram listing typical pointer data.

DESCRIPTION OF EMBODIMENTS

Preferred embodiments of the present invention are explained below with reference to the accompanying drawings.

Figure 1:
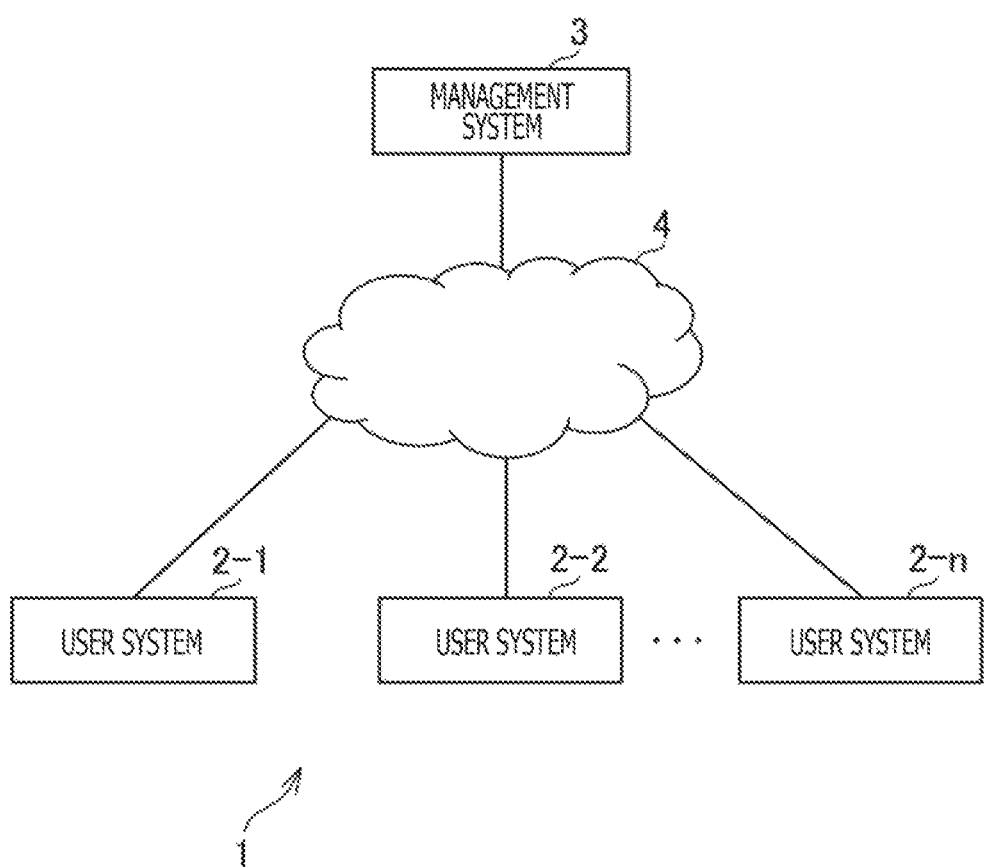
FIG. 1 is a schematic diagram depicting a typical overall configuration of a virtual space sharing system as one embodiment of the present invention.

FIG. 1 depicts a typical overall configuration of a virtual space sharing system 1 as one embodiment of the present invention. As depicted in FIG. 1, the virtual space sharing system 1 of this embodiment includes multiple user systems 2 (2-1, 2-2, . . . , 2-n) and a management system 3. The user systems 2 and the management system 3 are connected with a computer network 4 such as the Internet and are thereby allowed to communicate with one another.

Figure 2:
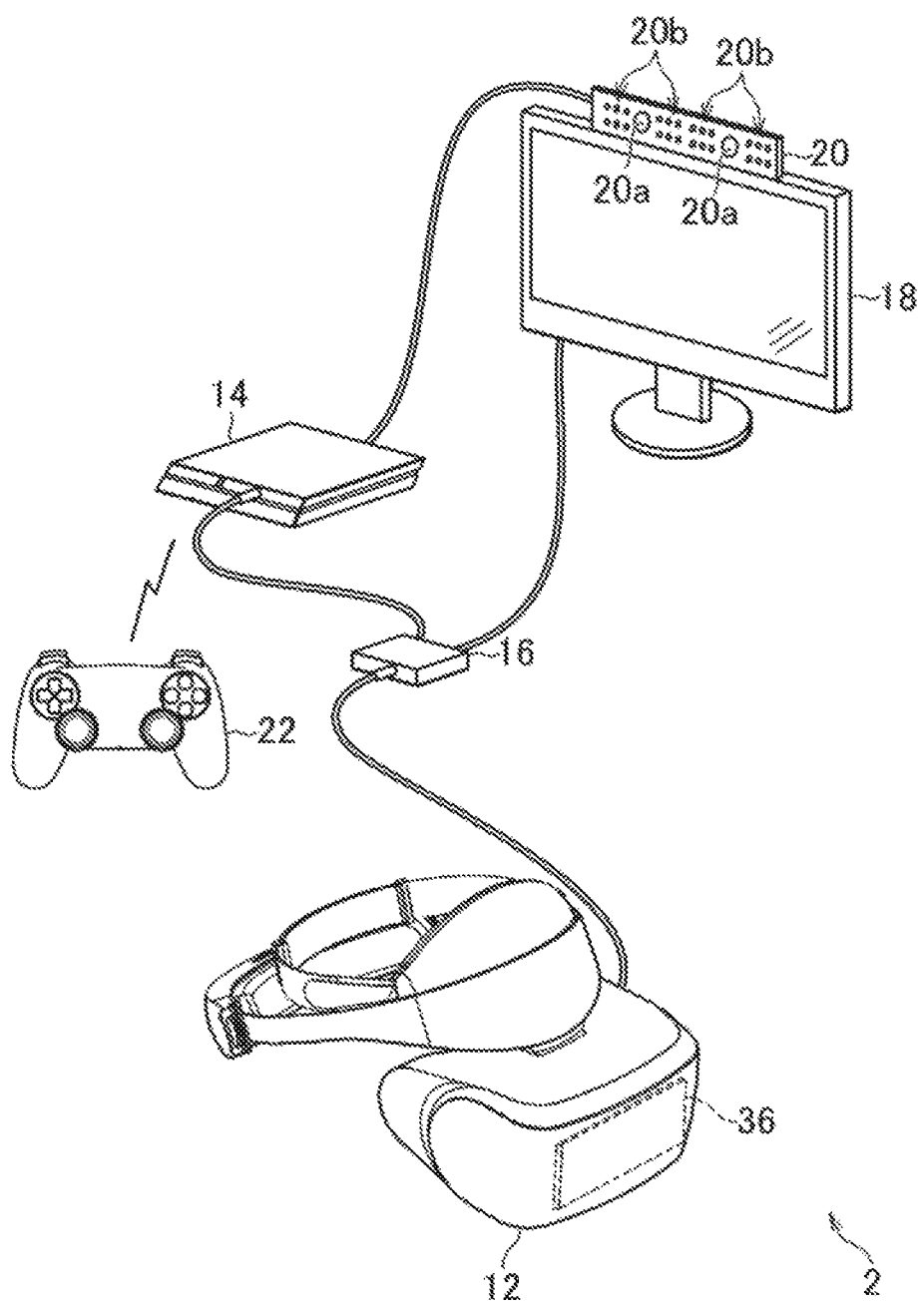
FIG. 2 is a schematic diagram depicting a typical configuration of a user system as part of the embodiment of the present invention.
Figure 3A:
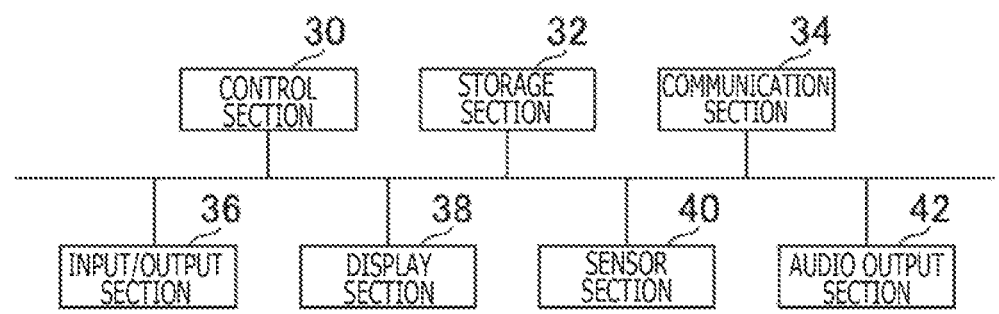
FIG. 3A is a schematic diagram depicting a typical configuration of a head-mounted display as part of the embodiment of the present invention.
Figure 3B:
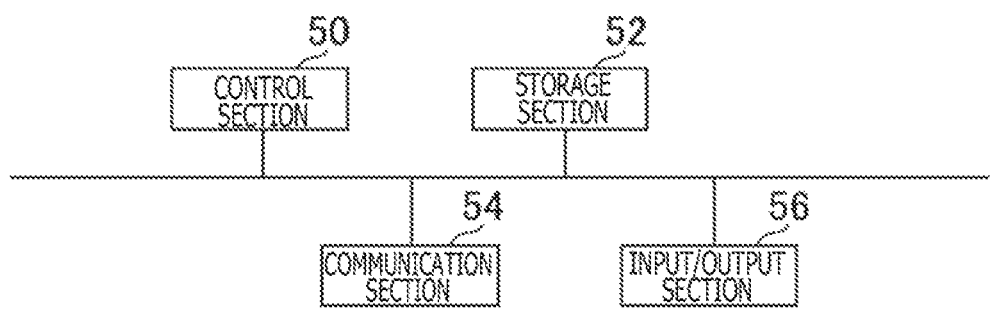
FIG. 3B is a schematic diagram depicting a typical configuration of an entertainment apparatus as part of the embodiment of the present invention.

FIG. 2 depicts a typical configuration of a user system 2 as part of the embodiment of the present invention. FIG. 3A depicts a typical configuration of a head-mounted display (HMD) 12 as part of this embodiment. FIG. 3B depicts a typical configuration of an entertainment apparatus 14 as part of this embodiment.

As depicted in FIG. 2, the user system 2 in this embodiment includes the HMO 12, the entertainment apparatus 14, a repeating apparatus 16, a display 18, a camera/microphone unit 20, and a controller 22.

The HMD 12 in this embodiment includes, as depicted in FIG. 3A, for example, a control section 30, a storage section 32, a communication section 34, an input/output section 36, a display section 38, a sensor section 40, and an audio output section 42.

The control section 30 is a program-controlled device such as a microprocessor that operates in accordance with programs installed in the HMD 12, for example.

The storage section 32 is a storage element such as a read only memory (ROM) or a random access memory (RAM). The storage section 32 stores programs to be executed by the control section 30, among other resources.

The communication section 34 is a communication interface such as a wireless local area network (LAN) module.

The input/output section 36 is an input/output port such as a High-Definition Multimedia Interface (HDMI (registered trademark)) port, a universal serial bus (USB) port, or an auxiliary (AUX) port.

The display section 38 is a display device such as a liquid-crystal display or an organic electroluminescence (EL) display arranged on the front of the HMD 12, the display section 38 displaying images generated by the entertainment apparatus 14, for example. Also, the display section 36 is housed in the enclosure of the HMD 12. The display section 38 may output images represented by a video signal that is output by the entertainment apparatus 14 and repeated by the repeating apparatus 16, for example, before being received by the display section 38 for image display. The display section 38 in this embodiment may display a three-dimensional image by presenting both a right-eye image and a left-eye image. Alternatively, the display section 38 may provide solely two-dimensional image display without displaying three-dimensional images.

The sensor section 40 includes sensors such as an acceleration sensor and a motion sensor. The sensor section 40 outputs motion data indicative of such measurements as the amount of rotation and travel distance of the HMD 12 to the control section 30 at a predetermined frame rate.

The audio output section 42 is typically headphones or speakers that output sounds represented by audio data generated by the entertainment apparatus 14, for example. The audio output section 42 outputs sounds represented by the audio signal that is output by the entertainment apparatus 14 and repeated by the repeating apparatus 16, for example, before being received by the audio output section 42 for audio output.

The entertainment apparatus 14 in this embodiment is a computer such as a game console, a digital versatile disk (DVD) player, or a Blu-ray (registered trademark) player. The entertainment apparatus 14 in this embodiment generates images and sounds by executing stored game programs or by reproducing content recorded on an optical disk, for example. Also, the entertainment apparatus 14 in this embodiment outputs the video signal representing generated images and the audio signal representing generated sounds to the HMD 12 or to the display 18 via the repeating apparatus 16.

The entertainment apparatus 14 in this embodiment includes, as depicted in FIG. 3B, for example, a control section 50, a storage section 52, a communication section 54, and an input/output section 56.

The control section 50 is a program-controlled device such as a central processing unit (CPU) that operates in accordance with programs installed in the entertainment apparatus 14, for example. The control section 50 in this embodiment includes a graphics processing unit (GPU) that renders images in a frame buffer on the basis of graphics commands and data supplied from the CPU.

The storage section 52 is a storage element such as a ROM or a RAM, or a hard disk drive. The storage section 52 stores programs to be executed by the control section 50, for example. Also, the storage section 52 in this embodiment appropriates a frame buffer area in which images are rendered by the GPU.

The communication section 54 is, for example, a communication interface such as a wireless LAN module.

The input/output section 56 is an input/output port such as a High-Definition Multimedia Interface (HDMI (registered trademark)) port or a USB port.

The repeating apparatus 16 in this embodiment is a computer that repeats the video and audio signals from the entertainment apparatus 34 for output to the HMD 12 or to the display 18.

The display 18 in this embodiment is a display device such as a liquid-crystal display that displays images represented by the video signal output from the entertainment apparatus 14, for example.

The camera/microphone unit 20 in this embodiment includes cameras 20a that capture images of objects and output the captured images to the entertainment apparatus 14, and microphones 20b that acquire sounds around the cameras 20a and in the surroundings, convert the acquired sounds into audio data, and output the audio data to the entertainment apparatus 14. Incidentally, the cameras 20a of this embodiment constitute a stereo camera.

The HMD 12 and the repeating apparatus 16 exchange data therebetween by wireless communication, for example. The entertainment apparatus 14 and the repeating apparatus 16 are interconnected via an HDMI cable or via a USB cable, for example, and are allowed to exchange data therebetween. The repeating apparatus 16 and the display 18 are interconnected via an HDMI cable, for example. The entertainment apparatus 14 and the camera/microphone unit 20 are interconnected via an AUX cable for example.

The controller 22 in this embodiment is an operation inputting apparatus used to perform input operations on the entertainment apparatus 14. The user may use the controller 22 to perform various input operations such as pressing arrows keys and buttons and tilting operating sticks, the keys and other controls being provided on the controller 22. In this embodiment, the controller 22 outputs the input data associated with the input operations to the entertainment apparatus 14. Also, the controller 22 in this embodiment is furnished with a USB port. A USB cable connecting the USB port with the entertainment apparatus 14 allows the controller 22 to output the input data to the entertainment apparatus 14 in wired fashion. The controller 22 in this embodiment is further provided with a wireless communication module, for example, which allows the input data to be output wirelessly to the entertainment apparatus 14.

The management system 3 is a computer system constituted by a server, for example. In this embodiment, multiple user systems 2 share a three-dimensional virtual space via the management system 3.

Figure 4:
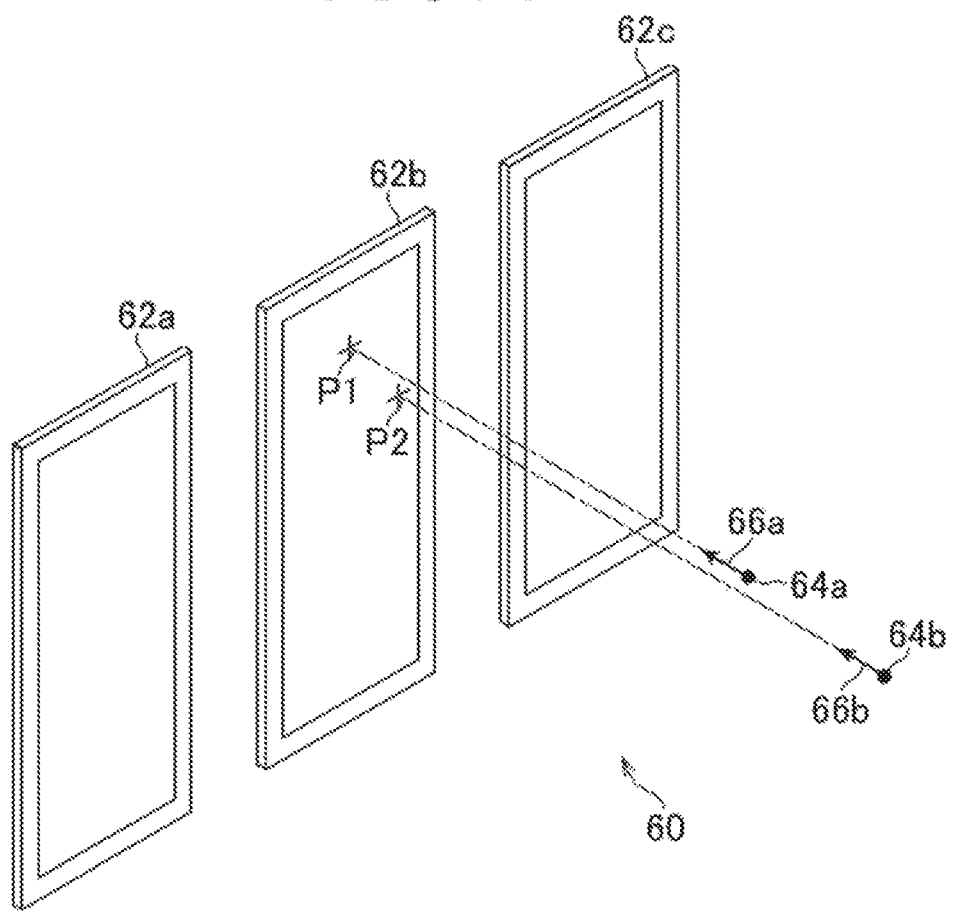
FIG. 4 is a schematic diagram depicting how a virtual space is shared by multiple user systems.

FIG. 4 depicts how a virtual space 60 is shared by the user systems 2-1 and 2-2, for example.

In the virtual space 60 depicted in FIG. 4, three plate-like three-dimensional virtual objects are arranged as hanging scroll objects 62 (hanging scroll objects 62a, 62b and 62c), each of the objects being an object of appreciation by users. Each of the hanging scroll objects 62 is a virtual object visible by the user wearing the HMD 12 included in each of the multiple user systems 2. The hanging scroll objects 62 are constituted by multiple polygons. Two-dimensional texture images such as hanging scroll images carrying calligraphic works and paintings, for example, are mapped to the front of the objects 62. In FIG. 4, a left-to-right direction as viewed from the front of the hanging scroll objects 62 is referred to as the positive X-axis direction. A front-to-back direction as viewed from the front of the hanging scroll objects 62 is referred to as the positive Y-axis direction. A bottom-to-top direction as viewed from the front of the hanging scroll objects 62 is referred to as the positive Z-axis direction.

The management system 3 transmits, for example, virtual space data representing the virtual space 60 depicted in FIG. 4 to a user system 2 upon request thereof. The virtual space data representing the shared virtual space is stored in each of the user systems 2. The virtual space data includes, for example, texture images and data indicative of the positions (e.g., coordinate values) of the hanging scroll objects 62 in the virtual space 60.

Also in the virtual space 69, an individual viewpoint 64 and an individual visual line direction 66 are set for each user system 2. The display section 36 of the HMD 12 included in each user system 2 displays an image indicating how things look when viewed from the individual viewpoint 64 in the visual line direction 66, both set for that user system 2. For example, an image indicative of how things look when viewed from a viewpoint 64a in a visual line direction 66a is displayed on the display section 3B of the HMD 12 included in the user system 2-1. Also, an image indicating how things look when viewed from a viewpoint 64b in a visual line direction 66b is displayed on the display section 38 of the HMD 12 included in the user system 2-2.

In the example of FIG. 4, both the visual line direction 66a and the visual line direction 56b are oriented in the positive Y-axis direction. Also, both a line passing through the viewpoint 64a in the visual line direction 66a and a line passing through the viewpoint 64b in the visual line direction 66b intersect with the hanging scroll object 62b. It is assumed here that P1 denotes the position of an intersection point between the line passing through the viewpoint 64a in the visual line direction 66a and the hanging scroll object 62b and that P2 represents the position of an intersection point between the line passing through the viewpoint 64b in the visual line direction 66b and the hanging scroll object 62b.

Figures 5, 6A:
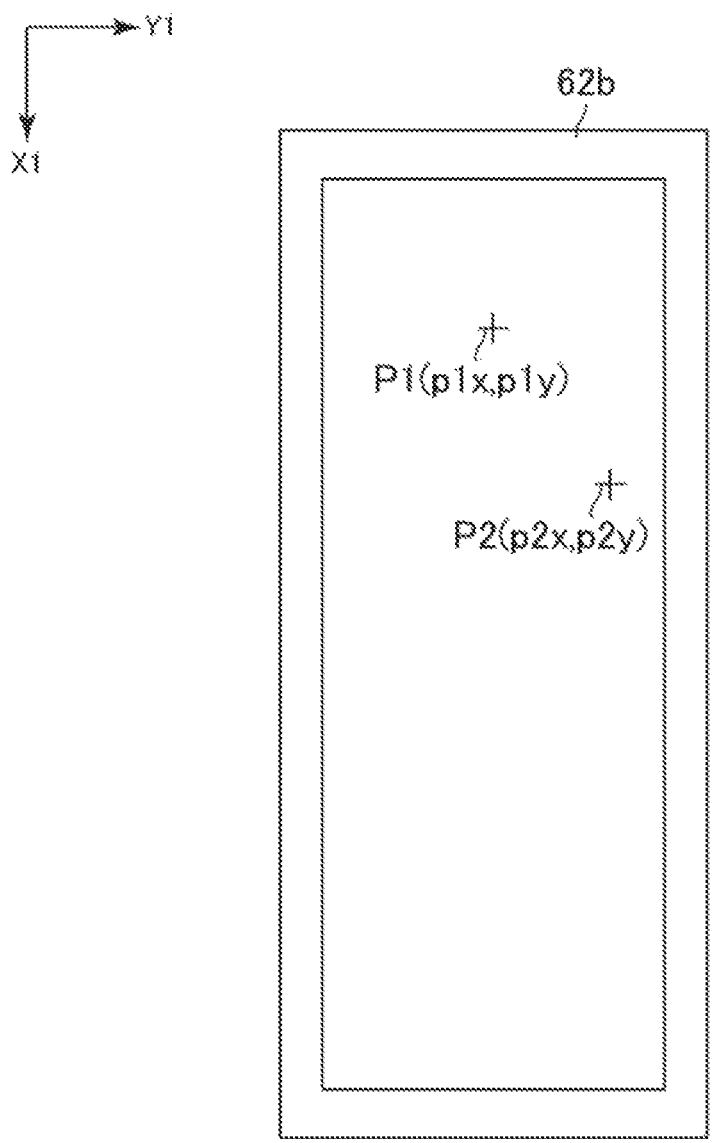
FIG. 5 is an explanatory diagram explaining typical coordinate values of positions in a texture image.
FIG. 6A is a tabular diagram listing typical viewpoint data.

Also, in an X1Y1 two-dimensional coordinate system for the texture image mapped to the surface of the hanging scroll object 62b depicted in FIG. 5, the coordinate values of the position P1 are assumed to be (p1x, p1y) and those of the position P2 to be (p2x, p2y). In the X1Y1 two-dimensional coordinate system, as indicated in FIG. 5, a top-to-bottom direction of the texture image is referred to as the positive X2-axis direction and a left-to-right direction of the texture image is referred to as the positive Y2-axis direction. The X1Y1 two-dimensional coordinate system may also be a texture coordinate system.

Also in this embodiment, the position and attitude of the HMD 12 are identified on the basis of images including that, of the HMD 12 captured by the camera 20a at a predetermined sampling rate and in accordance with measurements taken by the sensor section 40. In this embodiment, the position of the viewpoint 64 and the visual line direction 66 for each user system 2 are set in accordance with the position and attitude of the HMD 12 included in that user system 2. For example, when the user wearing the HMD 12 turns the HMD 12 to the right, the visual line direction 66 set for the user system 2 including the HMD 12 is turned to the right. Here, the amount of change in the visual line direction 66 may preferably be made in proportion to the amount of change in the orientation of the HMD 12. Also, when the user wearing the HMD 12 moves the HMD 12 horizontally rightward, for example, the position of the viewpoint 64 set for the user system 2 including that HMD 12 is moved horizontally rightward. Here, the amount of change in the position of the viewpoint 64 may preferably be made in proportion to the amount of change in the position of the HMD 12. With this embodiment, as described above, the user of each user system 2 may change the position and attitude of the HMD 12 included in that user system 2 in a manner changing correspondingly the position of the viewpoint 64 and the visual line direction 66, both set in the virtual space 60.

Also in this embodiment, each user system 2 receives, from the other user systems 2 included in the virtual space sharing system 1, viewpoint data indicative of the viewpoints 64 and of the visual line directions 66 set for these user systems 2.

FIGS. 6A and 6B list typical viewpoint data of this embodiment. As listed in FIGS. 6A and 6B, the viewpoint data of this embodiment includes user system identifiers (IDs), viewpoint position data, and visual line direction vector data. The user system IDs included in the viewpoint data are the identifier of each user system 2. The viewpoint data indicates the viewpoint 64 and visual line direction 66 of the user system 2 identified by each user system ID. In this embodiment, it is assumed that each of the user systems 2 included in the virtual space sharing system 1 is assigned a unique user system ID beforehand. For example, the user system ID of the user system 2-1 is assumed to be 1 and that of the user system 2-2 to be 2. The viewpoint position data indicates the position of each viewpoint 64. The visual line direction vector data indicates a vector in each visual line direction 66.

The viewpoint data listed in FIG. 6A indicates the viewpoint 64a and visual line direction 66a, both set for the user system 2-1. For example, the three-dimensional coordinate values (xa, ya, za) indicated by the viewpoint position data included in the viewpoint data in FIG. 6A denote the position of the viewpoint 64a. Also, the three-dimensional coordinate values (Vxa, Vya, Vza) indicated by the visual line direction vector data included in the viewpoint data in FIG. 6A represent, for example, a unit vector in the visual line direction 66a. In the case where the visual line direction 66a is oriented in the positive Y-axis direction as depicted in FIG. 4, for example, the values of (Vxa, Vya, Vza) are (0 1, 0).

The viewpoint data listed in FIG. 6B indicates the viewpoint 64b and the visual line direction 66b, both set for the user system 2-2. For example, the three-dimensional coordinate values (xb, yb, zb) indicated by the viewpoint position data included in the viewpoint data in FIG. 6B indicate the position of the viewpoint 64b. Also, the three-dimensional coordinate values (Vxb, Vyb, Vzb) indicated by the visual line direction vector data included in the viewpoint data in FIG. 6B indicate, for example, a unit vector in the visual line direction 66b. In the case where the visual line direction 66b is oriented in the positive Y-axis direction as depicted in FIG. 4, for example, the values of (Vxb, Vyb, Vzb) are (0, 1, 0).

The viewpoint data listed in FIG. 6A is transmitted from the user system 2-2 to the management system 3. In turn, the management system 3 transmits the viewpoint data to the user systems 2 other than the user system 2-1 such as the user system 2-2 included in the virtual space sharing system 1. Also, the viewpoint data listed in FIG. 6B is transmitted from the user system 2-2 to the management system 3. In turn, the management system 3 transmits the viewpoint data to the user systems 2 other than the user system 2-2 such as the user system 2-1 included in the virtual space sharing system 1. In this manner, the embodiment allows multiple user systems 2 to share the data indicative of the positions of the viewpoints 64 and of the visual line directions 66 set for the user systems 2 involved. That is, each user system 2 can identify the positions of the viewpoints 64 and the visual line directions 66 set for the other user systems 2.

Each user system 2 in this embodiment is allowed to arrange. In the shared virtual space, a viewpoint object indicative of the position of the viewpoint 64 set for another user system 2 and a fixation point object indicative of the position of a fixation point for the other user system 2. In the description that follows, the viewpoint object of this embodiment is referred to as a viewpoint indicator 68 and the fixation point object of the embodiment as a fixation point indicator 70. This embodiment, with the viewpoint indicator 68 and the fixation point indicator 70 being displayed, allows the user of each user system 2 to know what the users of the other user systems 2 are viewing from which viewpoint.

How the viewpoint indicator 68 and the fixation point indicator 70 are displayed is further explained below.

Figure 8:
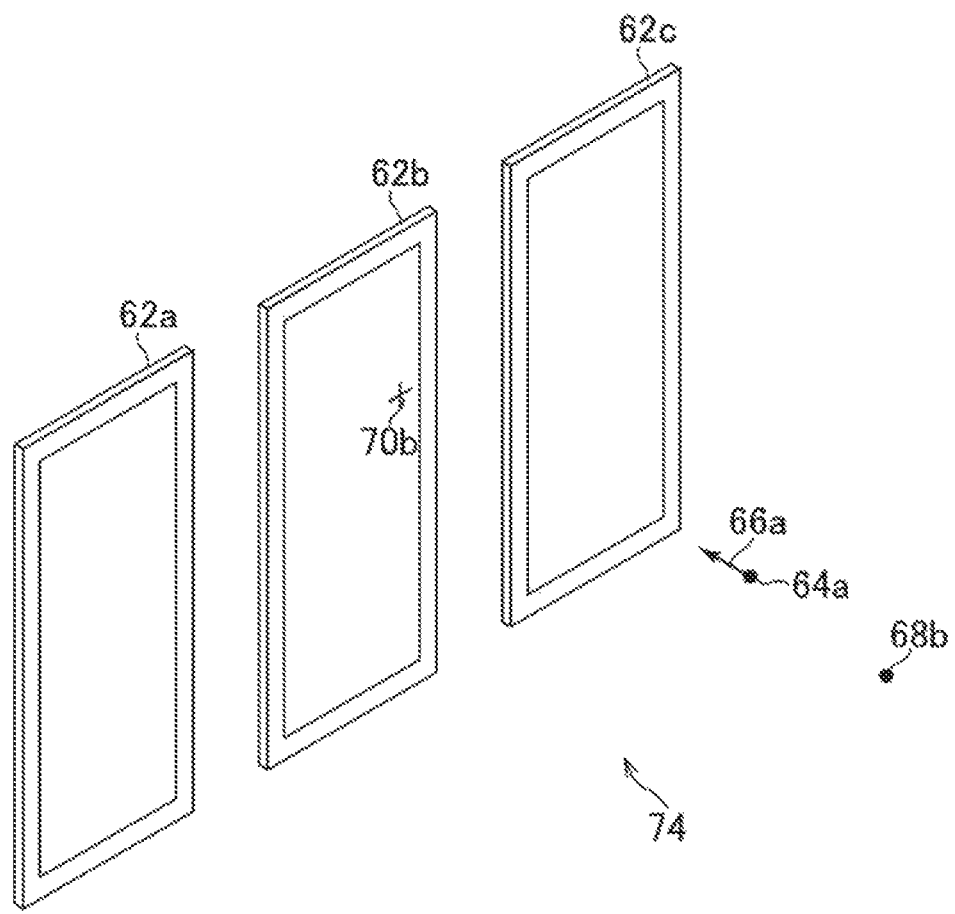
FIG. 8 is a schematic diagram depicting a typical virtual space.

FIG. 7 depicts a typical virtual space image 72a indicating how things look when viewed from the viewpoint 64a in the visual line direction 66a, the image 72a being displayed on the display section 38 of the HMD 12 in the user system 2-1. FIG. 8 depicts a typical virtual space 74 in which the viewpoint 64a and the visual line direction 66a are set where the virtual space image 72a in FIG. 7 is displayed on the HMD 12 in the user system 2-1.

Figure 9:
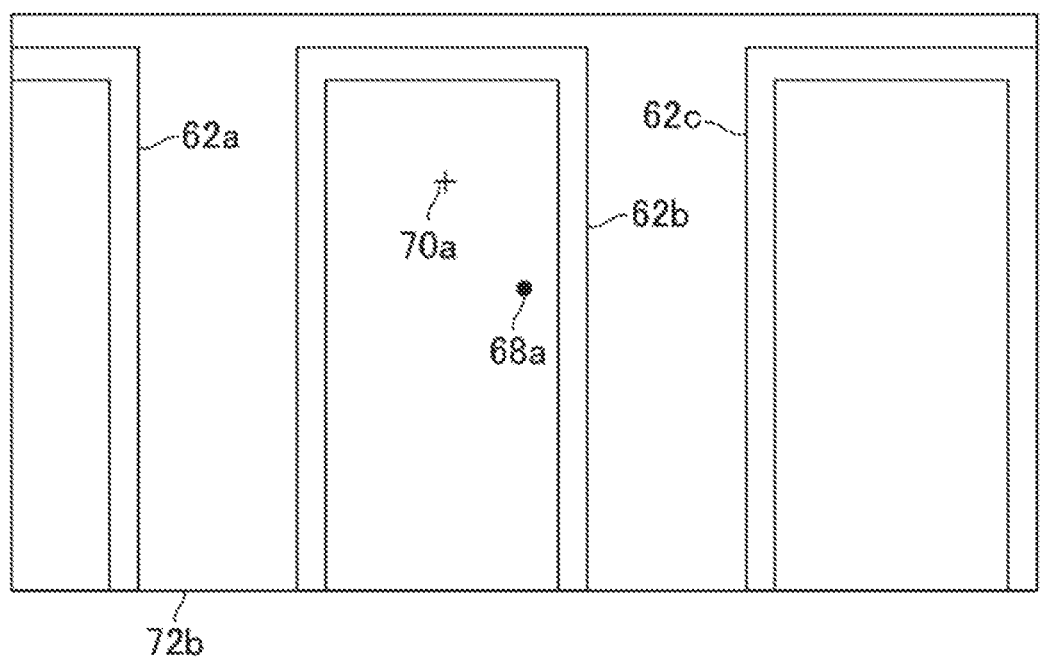
FIG. 9 is a schematic diagram depicting a typical virtual space image.
Figures 10, 11A:
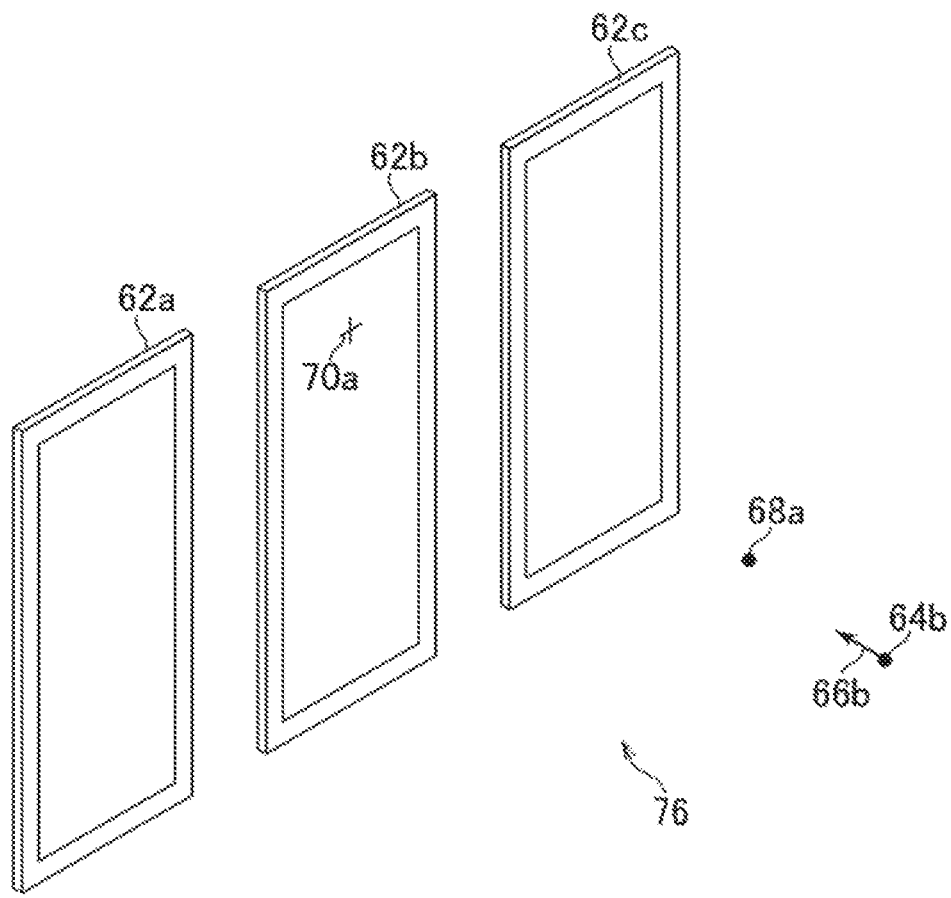
FIG. 10 is a schematic diagram depicting a typical virtual space.
FIG. 11A is a tabular diagram listing typical indicator data.

FIG. 9 depicts a typical virtual space image 72b indicating how things look when viewed from the viewpoint 64b in the visual line direction 66b, the image 72b being displayed on the display section 38 of the HMD 12 in the user system 2-2. FIG. 10 depicts a typical virtual space 76 in which the viewpoint 64b and the visual line direction 66b are set where the virtual space image 72b in FIG. 9 is displayed on the HMD 12 in the user system 2-2.

Incidentally, the virtual space image 72a or 72b may be a three-dimensional image or a two-dimensional image.

In the virtual space 74 depicted in FIG. 8, a viewpoint indicator 68b is arranged at the position of the viewpoint 64b associated with the user system 2-2. Also in the virtual space 74 in FIG. 8, a fixation point indicator 70b is arranged at the position (position P2 in FIG. 4) where a line passing through the viewpoint 64b in the visual line direction 66b intersects with the hanging scroll object 62b. Incidentally, in the example in FIG. 8 the viewpoint indicator 68b is arranged opposite the visual line direction 66a as viewed from the viewpoint 64a. That is, the Y coordinate value of the viewpoint indicator 68b is smaller than the Y coordinate value of the viewpoint 64a. For this reason, the image of the viewpoint indicator 68b is not included in the virtual space image 72a depicted in FIG. 7.

In the virtual space 76 depicted in FIG. 10, a viewpoint indicator 68a as a virtual object indicative of a viewpoint is arranged at the position of the viewpoint 64a associated with the user system 2-1. Also in the virtual space 76 in FIG. 10, a fixation point indicator 70a is arranged at the position (position P1 in FIG. 4) where a line passing through the viewpoint 64a in the visual line direction 66a intersects with the hanging scroll object 62b.

Incidentally, the viewpoint indicator 68b depicted in FIG. 8 and the viewpoint indicator 68a in FIG. 10 may be a spherical virtual three-dimensional object each, for example. Also, the fixation point indicator 70b in FIG. 8 and the fixation point indicator 70a in FIG. 10 may each be a cross-shaped two-dimensional image superposed on the texture image mapped to the hanging scroll object 62b, for example.

Figures 11B, 12:
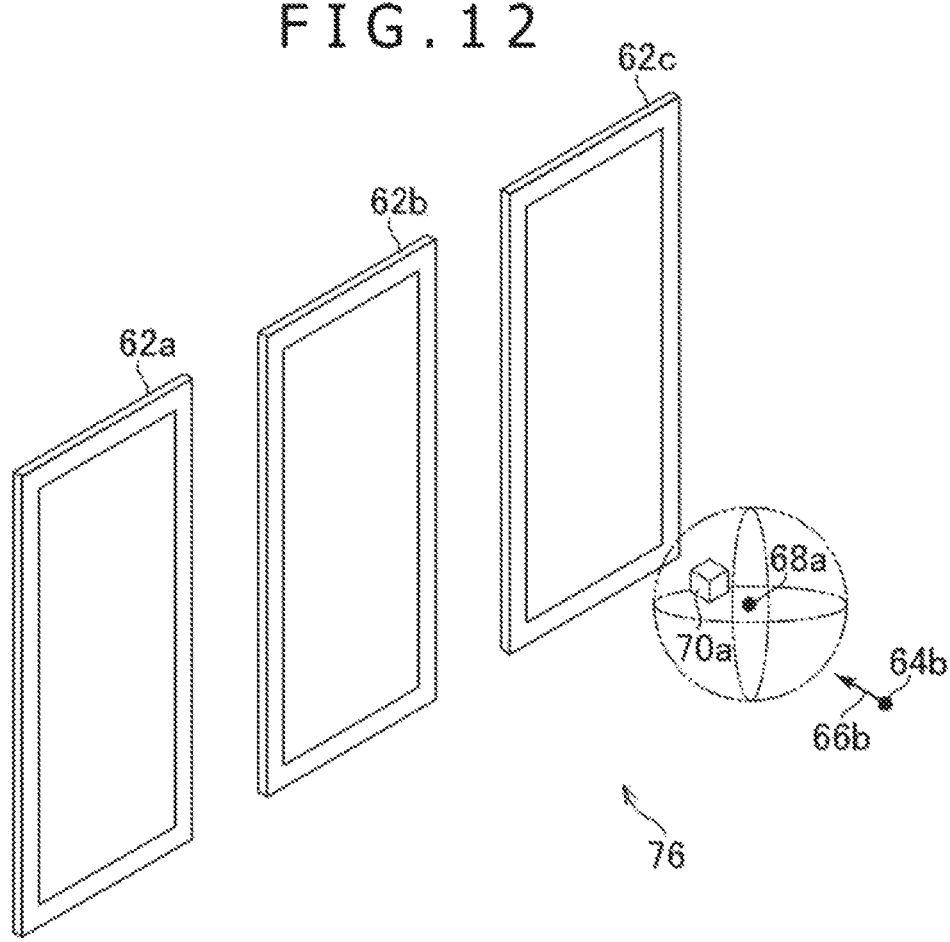
FIG. 11B is a tabular diagram listing other typical indicator data.
FIG. 12 is a schematic diagram depicting a typical virtual space.

FIG. 11A lists typical indicator data associated with the viewpoint indicator 68a and the fixation point indicator 70a. FIG. 11B lists typical indicator data associated with the viewpoint indicator 68b and the fixation point indicator 70b.

As listed in FIGS. 11A and 11B, the indicator data of this embodiment includes user system IDs, viewpoint indicator position data, texture IDs, and fixation point indicator position data. The user system IDs included in the indicator data are the identifiers of the user systems 2. The indicator data indicates the viewpoint indicator 68 associated with the viewpoint 64 and the fixation point indicator 70 associated with the visual line direction 66 in the user system 2 identified by each user system ID. The viewpoint indicator position data denotes the position of the viewpoint indicator 68. The texture IDs are the indicators of the texture images in which the fixation point indicators 70 are arranged. It is assumed here, for example, that the texture ID of the texture image mapped to the hanging scroll object 62b is 2. The fixation point indicator position data denotes the position of each fixation point indicator 70. In the fixation point indicator position data listed in FIGS. 11A and 11B, the position of each fixation point indicator 70 is represented by coordinate values in the X1Y1 two-dimensional coordinate system set for the texture image identified by the texture ID.

For example, the three-dimensional coordinate values (x1a y1a, z1a) indicated by the viewpoint indicator position data included in the indicator data in FIG. 11A denote the position of the viewpoint indicator 68a. Here, the three-dimensional coordinate values (x1a, y1a, z1a) are in an XYZ three-dimensional coordinate system. Also, the two-dimensional coordinate values (x2a, y2a) indicated by the fixation point indicator position data included in the indicator data in FIG. 11A denote the position of the fixation point indicator 70a, for example. Here, the two-dimensional coordinate values (x2a, y2a) are in the X1Y1 two-dimensional coordinate system set for the texture image mapped to the hanging scroll object 62b, for example.

Also, the three-dimensional coordinate values (x1b, y1b, z1b) indicated by the viewpoint indicator position data included in the indicator data in FIG. 11B denote, for example, the position of the viewpoint indicator 68b. Here, the three-dimensional coordinate values (x1b, y1b, z1b) are in the XYZ three-dimensional coordinate system. Further, the two-dimensional coordinate values (x2b, y2b) indicated by the taxation point indicator position data included in the indicator data in FIG. 11B denote the position of the fixation point indicator 70b, for example. Here, the two-dimensional coordinate values (x2b, y2b) are in the X1Y1 two-dimensional coordinate system set for the texture image mapped to the hanging scroll object 62b, for example.

In this embodiment, the user system 2-1 generates the indicator data listed in FIG. 11A on the basis of the viewpoint data in FIG. 6A. Also, the user system 2-2 generates the indicator data listed in FIG. 11B on the basis of the viewpoint data in FIG. 6B. The viewpoint indicators 68 and the fixation point indicators 70 are then arranged at the positions denoted by the generated indicator data in the virtual space. This embodiment thus allows the user of each user system 2 to know what the users of the other user systems 2 are viewing from which viewpoint in the shared virtual space.

Also in this embodiment, the audio data representing the sounds input to the microphone 20b included in each user system 2 is transmitted to the other user systems 2. The sounds represented by the audio data are then output from the audio output section 42 included in the HMD 12 of each user system 2. In this manner, the embodiment allows the users of the user systems 2 to communicate with each other by voice. This embodiment thus permits smooth communication between the users using as clues the voice and the images such as the viewpoint indicators 68 and fixation point indicators 70.

Figure 13:
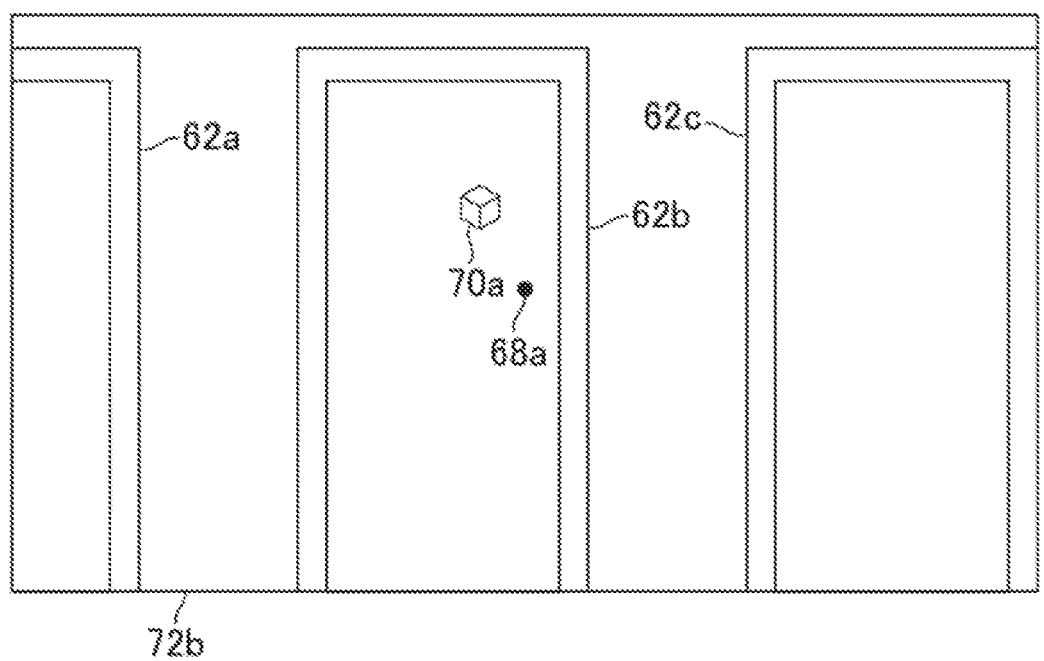
FIG. 13 is a schematic diagram depicting a typical virtual space image.

Incidentally, the positions and shapes of the viewpoint indicators 68 and fixation point indicators 70 are not limited to those discussed above. For example, as depicted in FIG. 12, the fixation point indicator 70a arranged in the virtual space 76 may be of a three-dimensional cubic shape. The fixation point indicator 70a in FIG. 12 is arranged, for example, at an intersection point between a line passing through the viewpoint 64a in the visual line direction 66a and a spherical surface with a predetermined radius centering on the viewpoint 64a. In this case, the virtual space image 72b depicted in FIG. 13, for example, is displayed on the display section 38 of the HMD 12 in the user system 2-2.

Also, the position of the fixation point indicator 70 may be represented not by two-dimensional coordinate values but by three-dimensional coordinate values, for example. In this case, the texture IDs may not be included in the indicator data. For example, where the fixation point indicator 70a depicted in FIG. 12 is arranged in the virtual space 76, the indicator data in FIG. 11A may not include the texture IDs, with the fixation point indicator position data allowed to be represented by three-dimensional coordinate values in the XYZ coordinate system.

Also, the colors and shapes of the objects representative of the viewpoint indicators 68 and fixation point indicators 70 may correspond, for example, to the user systems 2 associated with the objects. These objects may be designed to identify the corresponding user systems 2. In this manner, where multiple viewpoint indicators 68 are being displayed, the user of each user system 2 is allowed to know which viewpoint indicator 68 denotes the position of the user's viewpoint of which user system 2. Also, where multiple fixation point indicators 70 are being displayed, the user of each user system 2 is allowed to know which fixation point indicator 70 represents the user's visual line direction of which user system 2.

Also, this embodiment allows the user of each user system 2 to switch whether or not to display the viewpoint indicator 68 and whether or not to display the fixation point indicator 70 by carrying out predetermined operations on the controller 22, for example.

Alternatively, a three-dimensional object representing a user's silhouette based on an image captured of that user by the camera 20a may be generated. That three-dimensional object may be arranged in the virtual space as the object indicating the user's viewpoint 64 and visual line direction 66 in place of the viewpoint indicator 68 and the fixation point indicator 70. In this case, whether or not to display the three-dimensional object representing the user's silhouette may be switched by performing predetermined operations on the controller 22, for example.

Also, the user system 2-1 may generate the indicator data listed in FIG. 11A and transmit the generated indicator data to the user system 2-2, for example. Furthermore, the user system 2-2 may generate the indicator data listed in FIG. 11B and transmit the generated indicator data to the user system 2-1, for example.

The user systems 2 in this embodiment are also allowed to arrange pointers in the virtual space in accordance with predetermined operations performed by their users. How the pointer is displayed is explained further below.

Figure 14:
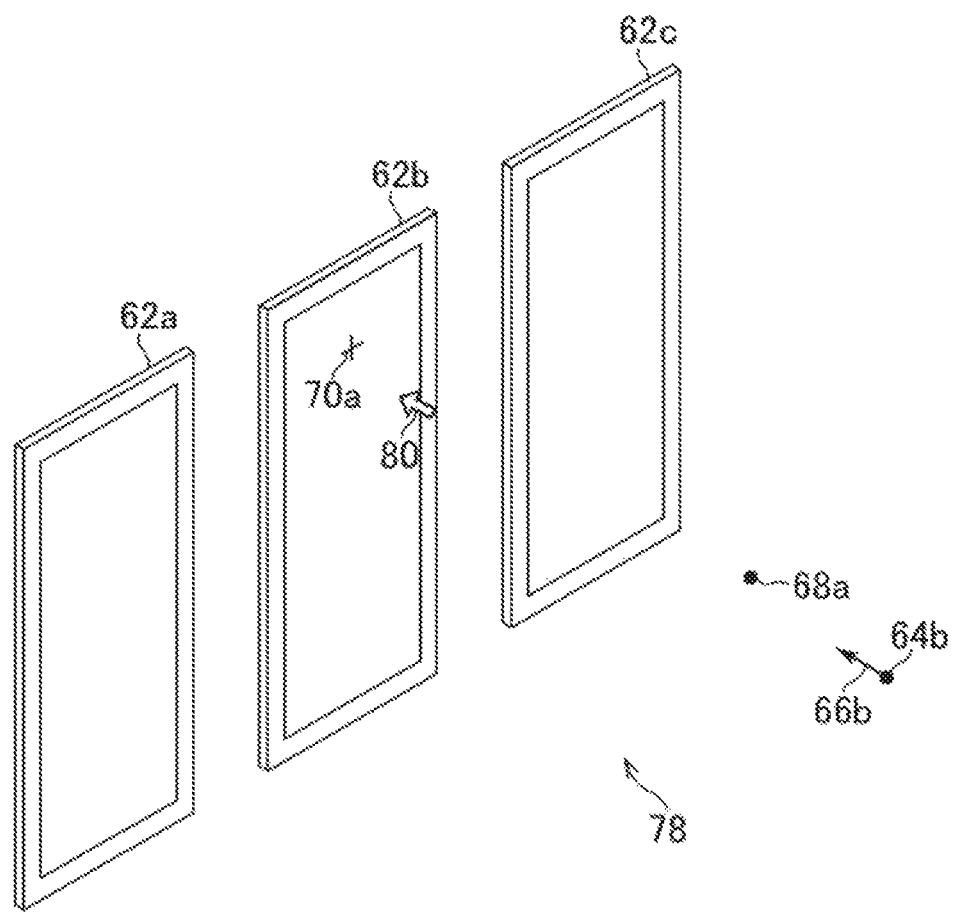
FIG. 14 is a schematic diagram depicting a typical virtual space.

FIG. 14 depicts a typical virtual space 73. The virtual space 78 in FIG. 14 illustrates how a pointer image 60 is arranged in accordance with a reset operation performed by the user of the user system 2-2 in the virtual space 76 indicated in FIG. 10 without the pointer image 80 being arranged therein. In this embodiment, the reset operation causes the pointer image 80 to be arranged at the position P2 of the intersection point between a line passing through the viewpoint 64b in the visual line direction 66b and the hanging scroll object 62b. Incidentally, the reset operation may be the pressing of a predetermined button on the controller 22, a click on a mouse that communicates with the entertainment apparatus 14, or a tap on a touch pad communicating with the entertainment apparatus 14, for example.

FIG. 15 depicts a typical virtual space image 72b indicating how things look from the viewpoint 64b in the visual line direction 66b inside the virtual space 78 indicated in FIG. 14, the image 72b being displayed on the display section 38 of the HMD 12 in the user system 2-2. The virtual space image 72b in FIG. 15 includes the pointer image 80 in addition to the viewpoint indicator 68a and the fixation point indicator 70a. The pointer image 80 of this embodiment is, for example, an arrow-shaped two-dimensional image superposed on the texture image mapped to the hanging scroll object 62b. In this manner, the embodiment allows the virtual space image to be displayed with the pointer arranged therein at an appropriate position in response to the reset operation performed by the user. Here, the pointer is arranged, for example, at the position P2 of the intersection point between a line passing through the viewpoint 64b in the visual line direction 66b and the hanging scroll object 62b.

FIG. 16 lists typical pointer data associated with the pointer image 80. As listed in FIG. 16, the pointer data of this embodiment includes a user system ID, a texture ID, and pointer position data. The user system ID included in the pointer data is the identifier of a given user system 2. The pointer data represents the pointer image 30 arranged by the user of the user system 2 identified by the user system ID. The texture ID is the identifier of the texture image to which the pointer image 80 is mapped. The pointer position data denotes the position of the pointer image 60.

In the pointer position data listed in FIG. 16, the position of the pointer image 80 is represented, by coordinate values in the X1Y1 two-dimensional coordinate system set for the texture image identified by the texture ID. Two-dimensional coordinate values (x3, y3) indicated by the pointer position data included in the pointer data in FIG. 16 denote the position of the pointer image 80 in the X1Y1 two-dimensional coordinate system set for the texture image mapped to the hanging scroll object 62b. In an initial state immediately after the reset operation, the pointer image 80 is arranged at the position P2. Thus the two-dimensional coordinate values (x3, y3) indicated by the pointer position data included in the pointer data in FIG. 16 become (p2x, p2y).

Also in this embodiment, the pointer data in FIG. 16 is transmitted from the user system 2-2 to the management system 3. In turn, the management system 3 transmits the pointer data to the user systems 2 other than the user system 2-2 such as the user system 2-1 in the virtual space sharing system 1. In this embodiment, the data indicative of the position of the pointer image 90 set for each user system 2 is thus shared by multiple user systems 2. That is, each user system 2 can identify the positions of the pointer images 80 set for the other user systems 2.

Figure 17:
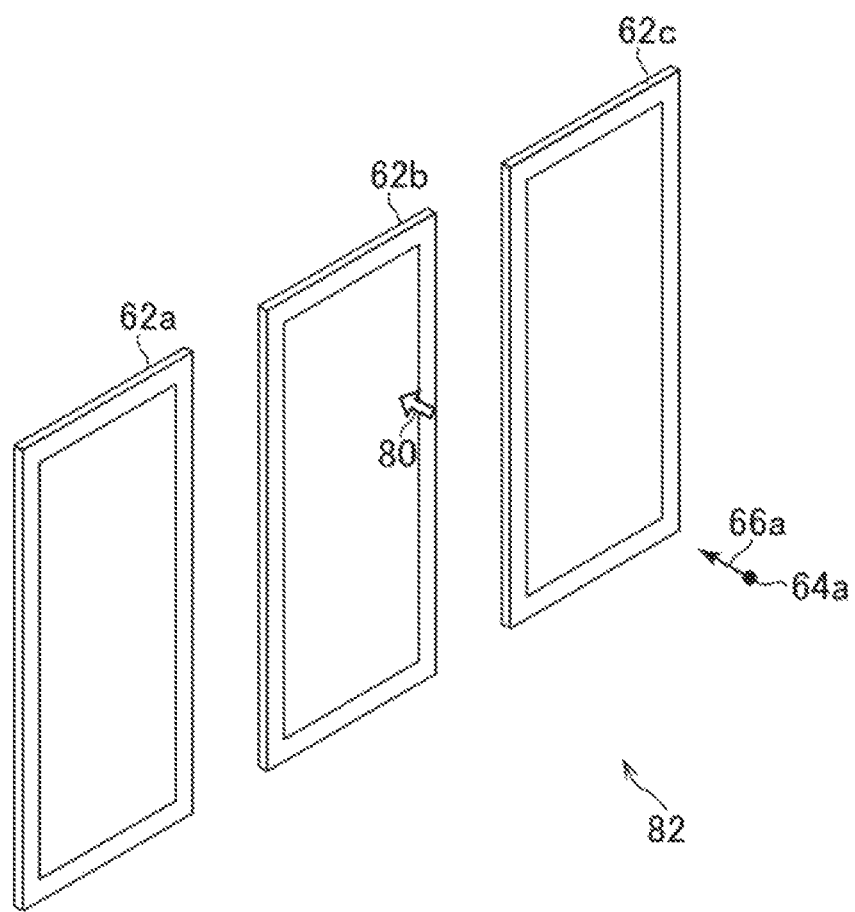
FIG. 17 is a schematic diagram depicting a typical virtual space.

FIG. 17 depicts a typical virtual space image 82 in which the pointer image 80 is arranged on the basis of the pointer data transmitted to the user system 2-1 as described above.

Figure 18:
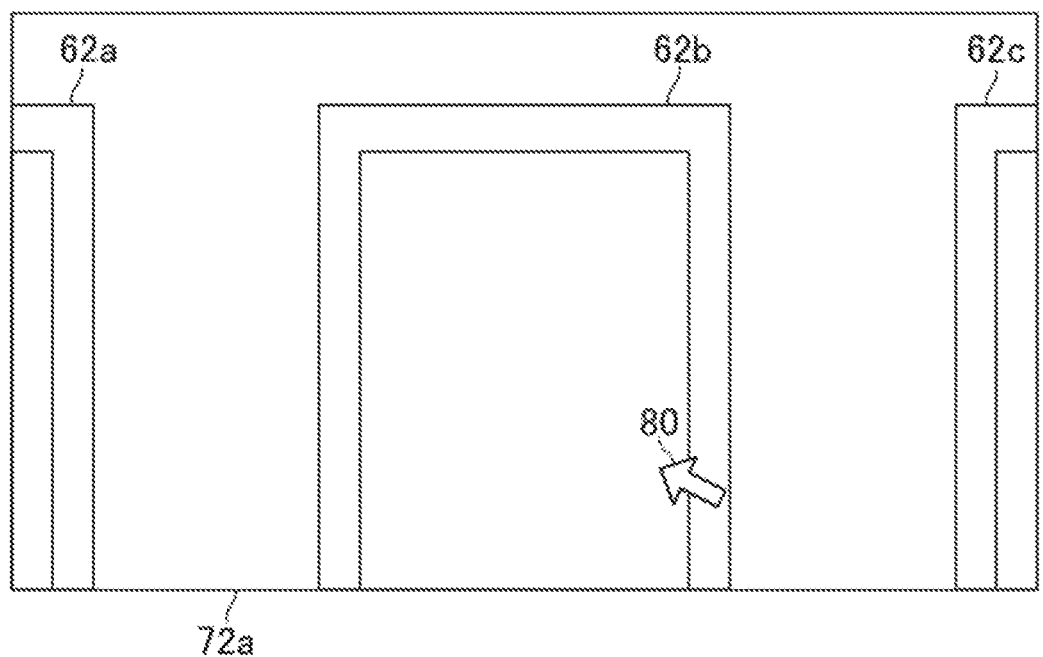
FIG. 18 is a schematic diagram depicting a typical virtual apace image.

As opposed to the virtual space 74 depicted in FIG. 8, the virtual space 82 in FIG. 17 has neither the viewpoint indicator 68b nor the fixation point indicator 70b arranged therein. FIG. 18 depicts a typical virtual space image 72a indicating how things look from the viewpoint 64a in the visual line direction 66a inside the virtual space 82 in FIG. 17, the image 72a being displayed on the display section 38 of the HMD 12 in the user system 2-1.

Also, this embodiment allows the user of each user system 2 to perform predetermined moving operations to change the position of the pointer image 80 arranged by the user system 2. Here, the moving operations are, for example, the pressing of arrow keys on the controller 22, a drag of the mouse that communicates with the entertainment apparatus 14, or a slide on the touch pad communicating with the entertainment apparatus 14. The position of the pointer image 80 may be changed here in the direction associated with a pressed arrow key, for example. Also, the position of the pointer image 80 may be changed in the direction in which the mouse is dragged or a slide is made on the touch pad, for example.

Also, by performing a predetermined erasing operation, the user of each user system 2 may erase the pointer image 30 arranged by the user system 2. The erasing operation here is, for example, the pressing of a predetermined button on the controller 22, a double click on the mouse that communicates with the entertainment apparatus 14, or a double tap on the touch pad communicating with the entertainment apparatus 14. In this case, the embodiment sets 0 to the texture ID and (0, 0) to the pointer position data in the pointer data. In the case where the texture ID is 0 and the pointer position data values are (0, 0) in the pointer data, this embodiment controls the pointer image 80 so as not to be arranged in the virtual space. Also, when a user system 2 receives the pointer data in which the texture ID is 0 and the pointer position data values are (0, 0), that user system 2 controls the pointer image 80 so as not to be arranged in the virtual space. Alternatively, when the erasing operation is performed, an instruction to erase the pointer image 80 may be transmitted in place of the above-described pointer data.

Further, known peak detection techniques may be used to identify whether a user's fingertips are present in a detection region of the real space on the basis of images captured by the camera 20a. Then an operation of putting the user's fingertips into the detection region, for example, may be handled as the reset operation mentioned above. Also, a change in the position of the user's fingertips in the detection region, for example, may be handled as the above-described reset operation. Here, the position of the pointer image 80 may be changed, for example, in the direction in which the user's fingertips are moved. Further, an operation of getting the user's fingertips outside of the detection region, for example, may be handled as the above reset operation.

Also, the position at which the pointer image 80 is arranged may be controlled to be limited to a range indicative of positions on the hanging scroll object 62b. More specifically, the moving range of the pointer image 80 may be limited to over the texture image of the hanging scroll object 62b on which the pointer image 80 is superposed. In this case, where the pointer image 80 is arranged at the rightmost edge of the texture image, the position of the pointer image 60 is controlled to remain unchanged even if an operation to move the pointer image 80 to the right is performed.

Also, when the user performs the reset operation, the pointer data may not be transmitted immediately. Instead, the pointer data may be transmitted later when the user performs a predetermined transmitting operation. With the predetermined transmitting operation carried out, the pointer image 80 may be arranged in the virtual space for the other user systems 2.

The pointer need not be a two-dimensional image and may be a three-dimensional virtual object, for example. Also, the position of the pointer may be represented not by two-dimensional coordinate values but by three-dimensional coordinate values, for example. In this case, the texture ID need not be included in the pointer data. For example, in the pointer data listed in FIG. 16, the texture ID may not be included and the pointer position data may be represented by three-dimensional coordinate values in the XYZ three-dimensional coordinate system.

Described below in more detail are the functions of the entertainment apparatus 14 in this embodiment as well as the processes performed by that apparatus.

Figure 19:
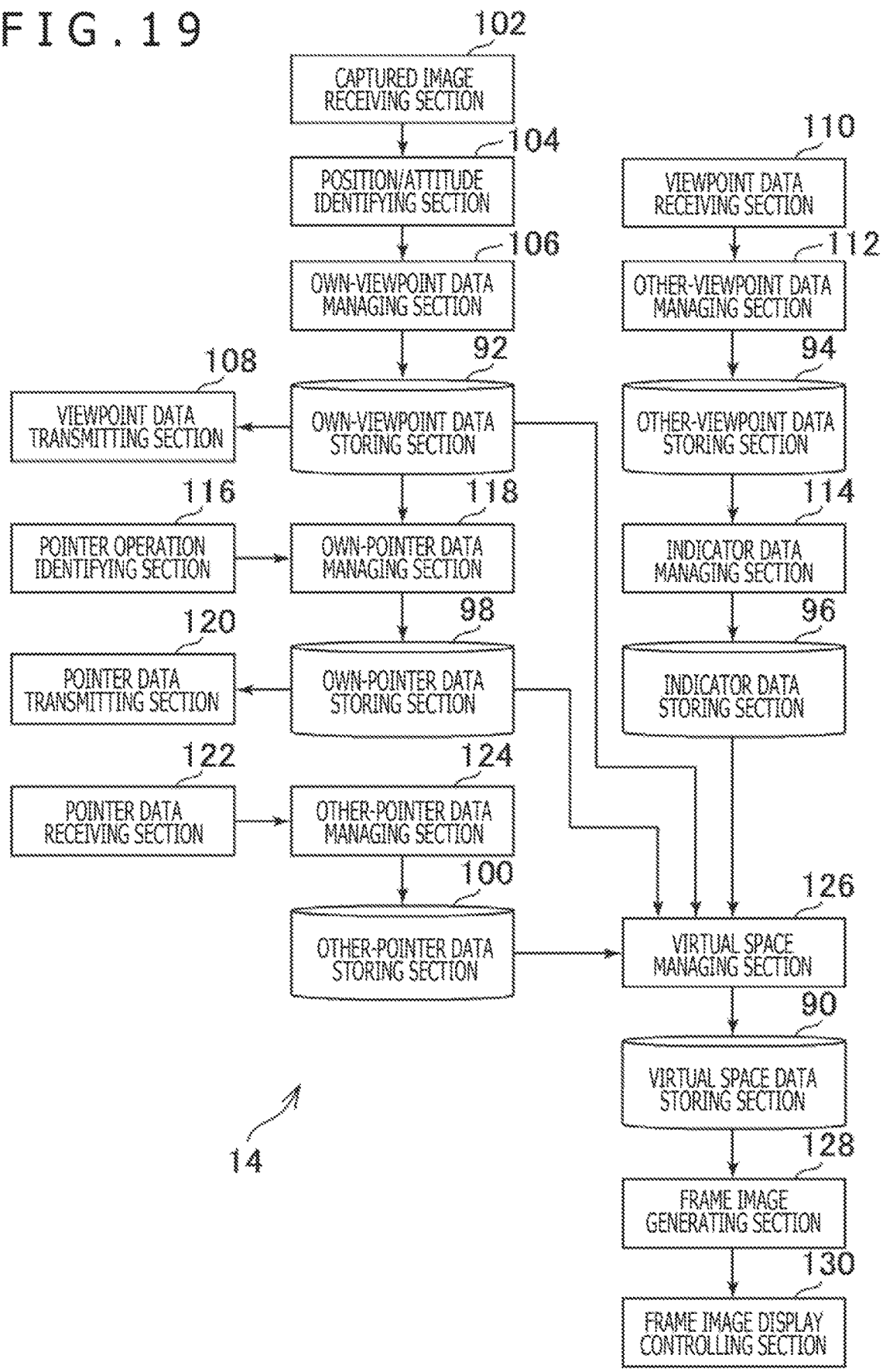
FIG. 19 is a functional block diagram depicting typical functions implemented by the entertainment apparatus as part of the embodiment of the present invention.

FIG. 19 is a functional block diagram depicting typical functions implemented by the entertainment apparatus 14 in this embodiment. Incidentally, the entertainment apparatus 14 in this embodiment need not implement all functions indicated in FIG. 19. Also, functions other than those in FIG. 19 may be implemented by the entertainment apparatus 14.

As depicted in FIG. 19, the entertainment apparatus 14 in this embodiment includes, in terms of functions, for example, a virtual space data storing section 90, an own viewpoint data storing section 92, an other-viewpoint data storing section 94, an indicator data storing section 96, an own-pointer data storing section 98, an other-pointer data storing section 100, a captured image receiving section 102, a position/attitude identifying section 104, an own-viewpoint data managing section 106, a viewpoint data transmitting section 108, a viewpoint data receiving section 110, an other-viewpoint data managing section 122, an indicator data managing section 114, a pointer operation identifying section 116, an own pointer data managing section 118, a pointer data transmitting section 120, a pointer data receiving section 122, an other-pointer data managing section 124, a virtual space managing section 126, a frame image generating section 128, and a frame image display controlling section 130.

The virtual space data storing section 90, own-viewpoint data storing section 92, other-viewpoint data storing section 94, indicator data storing section 96, own-pointer data storing section 99, and other-pointer data storing section 100 are implemented mainly using the storage section 52. The captured image receiving section 102 and frame image display controlling section 130 are implemented mainly using the input/output section 56. The position/attitude identifying section 104, own-viewpoint data managing section 106, other-viewpoint data managing section 112, indicator data managing section 114, own-pointer data managing section 118, other-pointer data managing section 124, virtual space managing section 126, and frame image generating section 128 are implemented mainly using the control section 50. The viewpoint data transmitting section 108, viewpoint data receiving section 110, pointer data transmitting section 120, and pointer data receiving section 122 are implemented mainly using the communication section 54. The pointer operation identifying section 116 is implemented mainly using the communication section 54 or the input/output section 56.

The above-mentioned functions may be implemented by the control section 50 executing programs including commands corresponding to these functions, the programs being installed in the entertainment apparatus 14 working as a computer. These programs may be carried, for example, by computer-readable information storage media such as optical disks, magnetic disks, magnetic tapes, magneto-optical disks, or flash memory; or brought through the Internet, when supplied to the entertainment apparatus 14.

The virtual space data storing section 90 in this embodiment stores, for example, the data indicative of the position (such as coordinate values) of each virtual object in the virtual space 60 in FIG. 4, in the virtual space 74 in FIG. 6, in the virtual space 76 in FIGS. 10 and 12, and in the virtual space 78 in FIG. 14. The virtual apace data storing section 90 also stores, for example, the data indicative of the positions of representative points in the hanging scroll object 62, in the viewpoint 64 and visual line direction 66, in the viewpoint indicator 68, in the fixation point indicator 70, and in the pointer image 80. The virtual space data storing section 90 may further store, for example, the data indicating the shapes and sizes of virtual objects, identifiers of texture images, and identifiers of virtual objects to which the texture images are mapped.

The own-viewpoint data storing section 92 in this embodiment stores, for example, the viewpoint data indicative of the position of the viewpoint 64 and the visual line direction of the user of the user system 2-2 that includes this own-viewpoint data storing section 92. As listed in FIGS. 6A and 6B, the viewpoint data includes, for example, user system IDs, viewpoint position data, and visual line direction vector data. The own-viewpoint data storing section 92 of the user system 2-2 stores, for example, the viewpoint data listed in FIG. 6A. Also, the own-viewpoint data storing section 92 of the user system 2-2 stores, for example, the viewpoint data listed in FIG. 6B. In this embodiment, the user system ID assigned to a given user system 2 is set, for example, as the user system ID for the viewpoint data stored in the own-viewpoint data storing section 92 of that user system 2.

The other-viewpoint data storing section 94 in this embodiment stores, for example, the viewpoint data indicating the position of the viewpoint 64 and the visual line direction 66 of the user of a user system 2 different from the user system 2 that includes this own-viewpoint data storing section 92. As listed in FIGS. 6A and 6B, the viewpoint data includes, for example, user system IDs, viewpoint position data, and visual line direction vector data.

The other-viewpoint data storing section 94 may store the viewpoint data about multiple viewpoints with different user system IDs. For example, the other-viewpoint data storing section 94 of the user system 2-1 may store the viewpoint data about multiple viewpoints associated with the user systems 2 which differ from the user system 2-1 and which are included in the virtual space sharing system 1. In this case, the viewpoint data listed in FIG. 6B is, for example, the viewpoint data about one of multiple viewpoints stored in the other-viewpoint data storing section 94 of the user system 2-1. Also, the other-viewpoint data storing section 94 of the user system 2-2 may store, for example, the viewpoint data about multiple viewpoints associated with the user systems 2 which differ from the user system 2-2 and which are included in the virtual space sharing system 1. In this case, the viewpoint, data listed in FIG. 6A is, for example, the viewpoint data about one of multiple viewpoints stored in the otter-viewpoint data storing section 94 of the user system 2-2.

The indicator data storing section 96 in this embodiment stores, for example, the indicator data associated with the position of the viewpoint 64 and the visual line direction 66 of the users of another user systems 2. As listed in FIGS. 11A and 11B, the indicator data includes, for example, a user system ID, viewpoint indicator position data, a texture ID, and fixation point indicator position data.

The indicator data storing section 96 may store multiple pieces of the indicator data about indicators with different user system IDs. For example, the indicator data storing section 96 of the user system 2-1 may store, for example, the indicator data about multiple indicators associated with the user systems 2 which differ from the user system 2-1 and which are included in the virtual space sharing system 1. In this case, the indicator data listed in FIG. 11B is, for example, the indicator data about one of multiple indicators stored in the indicator data storing section 96 of the user system 2-1. Also, the indicator data storing section 96 of the user system 2-2 may store, for example, the indicator data about multiple indicators associated with the user systems 2 which differ from the user system 2-7 and which are included in the virtual space sharing system 1. In this case, the viewpoint data listed in FIG. 11A is, for example, the indicator data about one of multiple indicators stored in the indicator data storing section 96 of the user system 2-2.

The own-pointer data storing section 98 in this embodiment stores, for example, the pointer data indicative of the pointer set by the user of a given user system 2 that includes this own-pointer data storing section 93. As listed in FIG. 16, the pointer data includes, for example, a user system ID, a texture ID, and pointer position data. For example, the own-pointer data storing section 98 of the user system 2-2 stores the pointer data listed in FIG. 16. Also in this embodiment, the user system ID assigned to a given user system 2 is set, for example, as the user system ID of the pointer data stored in the own-pointer data storing section 98 of that user system 2.

Incidentally, if the pointer is not arranged as described above in the virtual space by the user of a given user system 2, the texture ID included in the pointer data is set to 0, and the pointer position data values are set to (0, 0).

The other-pointer data storing section 100 in this embodiment stores, for example, the pointer data indicating the pointer set by the user of a user system 2 different from the user system 2 that includes this other-pointer data storing section 100.

The other-pointer data storing section 100 may store the pointer data about multiple pointers with different user system IDs. For example, the other-pointer data storing section 100 of the user system 2-1 may store the pointer data about multiple pointers associated with the user systems 2 which differ from the user system 2-1 and which are included in the virtual space sharing system 1. In this case, the pointer data listed in FIG. 16 is, for example, the pointer data about one of multiple pointers stored in the other-pointer data storing section 100 of the user system 2-1. Also, the ether-pointer data storing section 100 of the user system 2-2 may store, for example, the pointer data about multiple pointers associated with the user system 2 which differ from the user system 2-2 and which are included in the virtual space sharing system 1.

The captured image receiving section 102 in this embodiment receives, for example, images including that of the HMD 12 captured by the camera 20a at a predetermined sampling rate.

The position/attitude identifying section 104 in this embodiment identifies, for example, the position and attitude of the HMD 12 on the basis of the images received by the captured image receiving section 102. The position/attitude identifying section 104 may identify the position and attitude of the HMD 12 on the basis of motion data acquired by the sensor section 40 of the HMD 12, the motion data representing measurements such as the amount of rotation and the travel distance of the HMD 12. In this case, the position reached by the travel distance represented by the motion data from the previously identified position, for example, may be identified as the new position of the HMD 12. Also, the attitude reached by the amount of rotation represented by the motion data from the previously identified attitude, for example, may be identified as the new attitude of the HMD 12.

The own-viewpoint data managing section 106 in this embodiment updates the viewpoint data values stored in the own-viewpoint data storing section 92, the update being based on the position and attitude of the HMD 12 identified by the position/attitude identifying section 104, for example. Here, the viewpoint position data values may be updated, for example, in such a manner that the amount of change in the three-dimensional coordinate values indicated by the viewpoint position data included in the viewpoint data becomes proportional to the amount of change in the position of the HMD 12 identified by the position/attitude identifying section 104. Also, the visual line direction vector data values may be updated, for example, in such a manner that the amount of change in the vector indicated by the visual line direction vector data included in the viewpoint data becomes proportional to the amount of rotation of the HMD 12 identified by the position/attitude identifying section 104.

The viewpoint data transmitting section 108 in this embodiment transmits, for example, the viewpoint data stored in the own-viewpoint data storing section 92 to the management system 3. As described above, the management system 3 repeats the transmitted viewpoint data for transmission to the other user systems 2. Here, every time the viewpoint data stored in the own-viewpoint data storing section 92 is updated, for example, the updated viewpoint data values may be transmitted to the other user systems 2 by way of the management system 3 in response to the update. Also, the viewpoint data stored in the own-viewpoint data storing section 92 may be transmitted to the other user systems 2 via the management system 3, for example, at predetermined intervals (e.g., at intervals of 5 seconds).

The viewpoint data receiving section 110 in this embodiment receives, for example, the viewpoint data transmitted from the management system 3 repeating the transmissions from the other user systems 2.

The other-viewpoint data managing section 112 in this embodiment updates the viewpoint data values stored in the other-viewpoint data storing section 94 on the basis of the viewpoint data received by the viewpoint data receiving section 110, for example. Here, the other-viewpoint data managing section 112 may update the viewpoint data values stored in the other-viewpoint data storing section 94 in response to the receipt of viewpoint data by the viewpoint data receiving section 110.

The indicator data managing section 114 in this embodiment generates, for example, indicator data in a manner based on, and associated with, the viewpoint data stored in the other-viewpoint data storing section 94. For example, on the basis of the viewpoint data values stored in the other-viewpoint data storing section 94, the values of the indicator data of which the user system ID is the same as that of the viewpoint data are updated.

For example, the viewpoint position data values in the viewpoint data stored in the other-viewpoint data storing section 94 are set as the viewpoint indicator position data values of the indicator data of which the user system ID is the same as that of the viewpoint data.

Also identified by this embodiment is the texture image that intersects with a line passing through the position represented by the viewpoint position data in the viewpoint data stored in the other-viewpoint data storing section 94, the line being in the direction of the vector represented by the visual line direction vector data in the stored viewpoint data, for example. Also identified, are the two-dimensional coordinate values of the position of an intersection point between the texture image and the line passing through the position represented by the viewpoint position data in the viewpoint data, the coordinate values being in the X1Y1 coordinate system set for that texture image, the line being in the direction of the vector represented by the visual line direction vector data in the stored viewpoint data. Also, the identifier of the identified texture image is set, for example, as the texture ID for the indicator data of which the user system ID is the same as that of the viewpoint data. Furthermore, the identified two-dimensional coordinate values are set, for example, as the fixation point indicator position data values of the indicator data of which the user system ID is the same as that of the viewpoint data.

Also identified may be a spherical surface with a radius of a predetermined length centering on the position represented by the viewpoint position data in the viewpoint data stored in the other-viewpoint data storing section 94, for example, as depicted in FIG. 12. Also identified may be an intersection point between the identified spherical surface and a line passing through the position represented by the viewpoint position data in the viewpoint data stored in the other-viewpoint data storing section 94, the line being in the direction of the vector represented by the visual line direction vector data in the stored viewpoint data. The three-dimensional coordinate values of the identified intersection point may then be set as the fixation point indicator position data values of the indicator data of which the user system ID is the same as that of the viewpoint data. In this case, the Indicator data need not included a texture ID.

The pointer operation identifying section 116 in this embodiment identifies operations regarding the pointer arranged in the virtual space, such as the above-mentioned reset operation, moving operation, or erasing operation. Here, upon detection of an operation performed by the user, for example, on the above-mentioned controller 22, mouse, or touch pad, the operation corresponding to the user's operation is identified to be carried out on the pointer image 80.

When the pointer operation identifying section 116 identifies the operation regarding the pointer image 80, for example, the own-pointer data managing section 118 in this embodiment updates the pointer data stored in the own-pointer data storing section 98 in a manner reflecting the identified operation.

For example, when the reset operation is identified, what is identified at this point is a texture image that intersects with a line passing through the position indicated by the viewpoint position data in the viewpoint data stored in the own-pointer data storing section 98, the line being in the direction of the vector indicated by the visual line direction vector data in the stored viewpoint data. Also identified are the two-dimensional coordinate values of the position of an intersection point between the texture image and the line passing through the position indicated by the viewpoint position data in the viewpoint data stored in the own-pointer data storing section 98, the line being in the direction of the vector indicated by the visual line direction vector data in the stored viewpoint data. Incidentally, the two-dimensional coordinate values are in the X1Y1 two-dimensional coordinate system set for the texture image, for example.

The identifier of the identified texture image is then set as the texture ID included in the pointer data stored in the own-pointer data storing section 98. Also, the identified two-dimensional coordinate values are set, for example, as the pointer position data values included in the stored pointer data.

Further, when the moving operation is identified, the pointer position data values included in the pointer data stored in the own-pointer data storing section 98 are updated, for example, with the values reflecting the identified moving operation. Here, the own-pointer data managing section 113 may perform control in such a manner that the pointer position data values are limited to the range of the two-dimensional coordinate values indicative of positions on the hanging scroll object 62*b*.

Also, when the erasing operation is identified, the value of the texture ID is updated to 0 and the pointer position data values are updated to (0, 0), for example.

The pointer data transmitting section 120 in this embodiment transmits to the management system 3 the pointer data stored in the own-pointer data scoring section 98, for example. As described above, the management system 3 repeats the transmitted pointer data for transmission to the other user systems 2. Here, every time the pointer data stored in the own-pointer data storing section 98 is updated, for example, the updated viewpoint data values resulting front the update may be transmitted to the other user systems 2 via the management system 3. Also, the pointer data stored in the own-pointer data storing section 98 may be transmitted to the other user systems 2 via the management system 3 at predetermined intervals (such as 5 seconds), for example.

The pointer data receiving section 122 in this embodiment receives the pointer data transmitted, for example, by the management system 3 repeating the transmissions from the other user systems 2.

The other-pointer data managing section 124 in this embodiment updates the pointer data values stored in the other-pointer data storing section 100 on the basis of the pointer data received by the pointer data receiving section 122, for example. Here, the other-pointer data managing section 124 may update the pointer data values stored in the other-pointer data storing section 100 in response to the receipt of pointer data by the pointer data receiving section 122.

The virtual space managing section 126 in this embodiment arranges various virtual objects in the virtual space targeted for display. In this embodiment, the virtual space managing section 126 arranges diverse virtual objects in the virtual space by setting, for example, the values of diverse data stored in the virtual space data storing section 90. The viewpoint 64 and the visual line direction 66 are arranged, for example, on the basis of the viewpoint data stored is the own-viewpoint data storing section 92. Also, the viewpoint indicator 68 and the fixation point indicator 70 are arranged on the basis of the indicator data stored in the indicator data storing section 96, for example. Furthermore, the pointers are arranged on the basis of the pointer data stored in the own-pointer data storing section 98 and in the other-pointer data storing section 200, for example.

Here, various objects are arranged in the virtual space 74 depicted in FIG. 8 when, for example, the virtual space managing section 126 of the user system 2-1 sets the values of diverse data corresponding to the virtual space 74. For example, the viewpoint 64*a* and the visual line direction 66*a* are arranged in the virtual space 74 in a manner reflecting, for example, the viewpoint data stored in the own-viewpoint data storing section 52 of the user system 2-2. Also, the viewpoint indicator 63*b* and the fixation point indicator 70*b* are arranged in the virtual space 74 in a manner reflecting, for example, the indicator data stored in the indicator data storing section 96 of the user system 2-1. In this case, the virtual space managing section 126 arranges the fixation point indicator 70*b* at a position away from the viewpoint 64*b* in the visual line direction 66*b* passing through the viewpoint 64*b*, the visual line direction 66*b* corresponding to the attitude of the HMD 12 included in the user system 2-2.

Likewise, various objects are arranged in the virtual space 82 depicted in FIG. 17 when, for example, the virtual space managing section 126 of the user system 2-1 sets the values of various data corresponding to the virtual space 82. In the virtual space 82, the viewpoint 64*a* and the visual line direction 66*a* are arranged, for example, in accordance with the viewpoint data stored in the own-viewpoint data storing section 92 of the user system 2-1. Also in the virtual space 82, the pointer image 80 reflecting, for example, the pointer data stored in the other-pointer data storing section 100 of the user system 2-1 is arranged. In this case, the virtual space managing section 126 of the user system 2-1 arranges the pointer at a position in the virtual space in a manner reflecting how the HMD 12 included in the user system 2-2 is oriented.

Further, various objects are arranged in the virtual space 76 depicted in FIG. 10 or 12 when, for example, the virtual space managing sector 126 of the user system 2-2 sets the values of various data corresponding to the virtual space 76. In the virtual space 76, the viewpoint 64*b* and the visual line direction 66*b* are arranged, for example, in accordance with the viewpoint data stored in the own-viewpoint data storing section 92 of the user system 2-2. Also, the viewpoint indicator 68*a* and the fixation point indicator 70*a* are arranged in the virtual space 76 in a manner reflecting, for example, the indicator data stored in the indicator data storing section 96 of the user system 2-2. In this case, the virtual space managing section 126 arranges the fixation point indicator 70*a* at a position away from the viewpoint 64*a* in the visual line direction 66*a* passing through the viewpoint 64*a*, the visual line direction 66*a* corresponding to the attitude of the HMD 12 included in the user system 2-3.

Also, various objects are arranged likewise in the virtual space 78 depicted in FIG. 14 when, for example, the virtual space managing section 126 of the user system 2-2 sets the values of various data corresponding to the virtual space 78. In the virtual space 78, the viewpoint 64*b* and the visual line direction 66*b* are arranged, for example, in accordance with the viewpoint data stored in the own-viewpoint data storing section 92 of the user system 2-2. Also in the virtual space 78, the viewpoint indicator 68*a* and the fixation point indicator 70*a* are arranged in accordance with the indicator data stored in the indicator data storing section 96 of the user system 2-2. Further in the virtual space 78, the pointer image 80 is arranged in a manner reflecting the pointer data stored in the own-pointer data storing section 98 of the user system 2-2. In this case, the virtual space managing section 126 of the user system 2-2 arranges the pointer at a position in the virtual space in a manner reflecting how the HMD 12 included in the user system 2-2 is oriented.

Furthermore, the virtual space managing section 126 may hold flags indicating whether or not each of the viewpoint indicators 68 and the fixation point indicators 70 is to be arranged. The values of the flags may be varied in response to the user's operations. The flag values may then be set to control whether or not to arrange each of the viewpoint indicators 68 and the fixation point indicators 70. For example, suppose that the user' operations of the user system 2-1 set flag values specifying that the viewpoint indicators 68 and the fixation point indicators 70 are to be arranged. In this the viewpoint indicator 68*b* and the fixation point indicator 70*b* may be arranged in the virtual space as depicted in FIG. 8. Also, suppose that the user' operations of the user system 2-1 set flag values specifying that the viewpoint indicators 63 and the fixation point indicators 79 are not to be arranged. In this case, the viewpoint indicator 66*b* and the fixation point indicator 70*b* may not be arranged in the virtual space as depicted in FIG. 17.

Also, the virtual space managing section 126 may arrange in the virtual space the viewpoint indicators 68 and the fixation point indicators 70 in a manner allowing the corresponding user systems 2, i.e., the corresponding HMDs 12, to be identified thereby. For example, the viewpoint indicators 68 and fixation point indicators 70 of colors and shapes corresponding to the user system IDs included in the indicator data may be arranged in the virtual space. In this case, each of the multiple viewpoint indicators 68 arranged in the virtual space is an object that allows the corresponding user system 2, i.e., the corresponding HMD 12, to be identified. Also, each of the multiple fixation point indicators 70 arranged in the virtual space is an object that allows the corresponding user system 2, i.e., the corresponding HMD 12, to be identified.

Further, when the user wearing the HMD 12 performs a moving operation, the pointer position data values included in the pointer data stored in the own-pointer data storing section 98 are updated with the values reflecting the moving operation. In turn, the virtual space managing section 126 changes the position at which the pointer image 80 is arranged in a manner reflecting the updated values of the pointer position data. In this manner, the virtual space managing section 126 in this embodiment changes the position at which the pointer image 30 is arranged, in accordance with the moving operation performed by the user wearing the HMD 12.

Also, as discussed above, there is a case in which the pointer position data values are limited to the range of the two-dimensional coordinate values indicative of positions on the hanging scroll object 62*b*. In this case, the virtual space managing section 126 in this embodiment performs control in such a manner that the position at which the pointer is arranged is limited to the range indicative of positions on the virtual objects arranged in the virtual space. Alternatively, as described above, the virtual space managing section 126 may perform control in such a manner that the position at which the pointer is arranged is limited to the range of positions on one of multiple virtual objects that intersects with a line in the direction in which the HMD 12 is oriented, the multiple virtual objects being arranged in the virtual space.

The frame image generating section 128 in this embodiment generates, at a predetermined frame rate, an image representing how things look from the position of the viewpoint 64 in the visual line direction 66, for example, the viewpoint 64 being arranged in the virtual space by the virtual space managing section 126. For example, the frame image generating section 128 of the user system 2-1 generates as a frame image the virtual space image 72*a* depicted in FIG. 7 or 18. In this case, the frame image generating section 128 generates the image indicating how things look from the viewpoint 64*a* in the visual line direction 66*a* reflecting the attitude of the HMD 12 included in the user system 2-1, the viewpoint 64a being arranged in the virtual space where the fixation point indicator 70b is arranged, for example. Also, the frame image generating section 128 of the user system 2-2 generates as a frame image the virtual space image 72b depicted in FIG. 9, 13, or 15, for example. In this case, the frame image generating section 128 generates the image indicating how things look from the viewpoint 64b in the visual line direction 66b reflecting the attitude of the HMD 12 included in the user system 2-2, the viewpoint 64b being arranged in the virtual space where the fixation point indicator 70a is arranged, for example.

The frame image display controlling section 130 in this embodiment displays, for example, a virtual space image 72 indicative of the virtual space in which pointers are arranged. The frame image display controlling section 130 displays, at a predetermined frame rate, the frame image generated by the frame image generating section 128 on the display section 38 of the HMD 12, for example. In this embodiment, the frame image display controlling section 130 of the user system 2-1 transmits the virtual space image 72a generated by the frame image generating section 128 of the user system 2-1, to the HMD 12 included in the user system 2-1, for example. The HMD 12 upon receipt of the frame image causes the received frame image to be displayed on the display section 38 of the HMD 12. Also, the frame image display controlling section 130 of the user system 2-2 transmits the virtual space image 72b generated by the frame image generating section 128 of the user system 2-2, to the HMD 12 included in the user system 2-2, for example. The HMD 12 upon receipt of the frame image causes the received frame image to be displayed on the display section 38 of the HMD 12.

Incidentally, as depicted in FIG. 18, the frame image display controlling section 130 of the user system 2-1 may cause the HMD 22 included in the user system 2-1 to display the virtual space image 72a in which is arranged the pointer reflecting how the HMD 12 included in the user system 2-2 is oriented.

Figure 20:
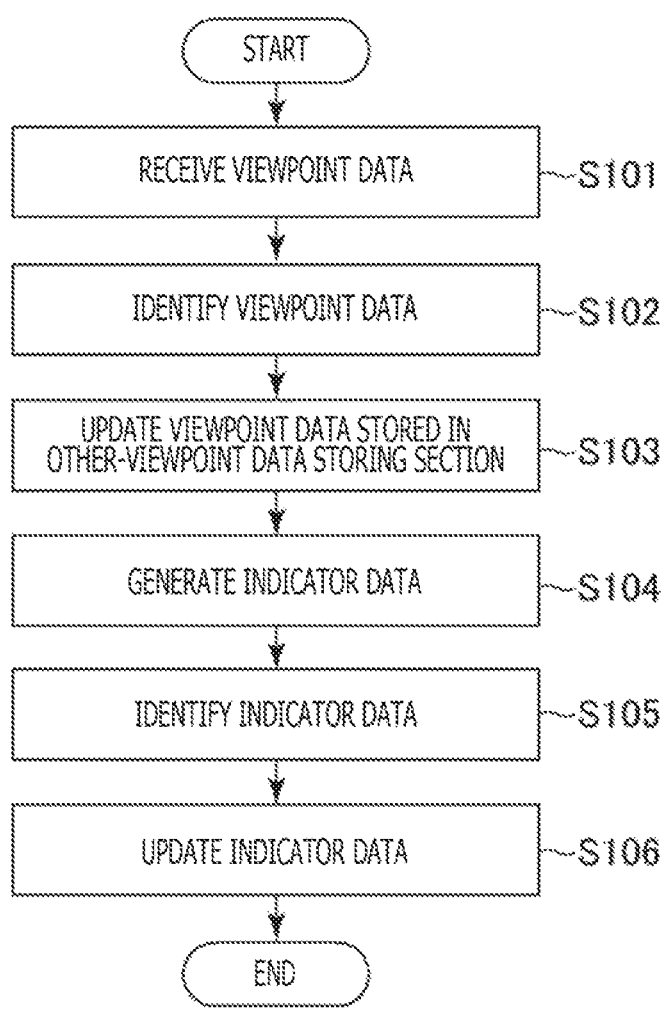
FIG. 20 is a flowchart depicting a typical flow of processing performed by the entertainment apparatus as part of the embodiment of the present invention.

Explained below with reference to the flowchart of FIG. 20 is a typical flow of processing performed by the entertainment apparatus 14 of this embodiment upon receipt of viewpoint data.

The viewpoint data receiving section 110 first receives viewpoint data (S101). In turn, the other-viewpoint data managing section 112 identifies (S102) the viewpoint data which is stored in the other-viewpoint data storing section 94 and which includes the same user system ID as that of the viewpoint data received in the process of S101.

The other-viewpoint data managing section 112 then updates (S103) the viewpoint data identified in the process of S102 to the viewpoint data received in the process of S101.

The indicator data managing section 114 thereafter generates (S104) indicator data on the basis of the viewpoint data updated in the process of S103 as described above. The viewpoint indicator position data values included in the indicator data generated here are identifiable on the basis of the viewpoint position data values included in the viewpoint data updated in the process of S103 as discussed above. Also, the texture ID and the fixation point indicator position data values included in the generated indicator data are identifiable on the basis of the viewpoint position data values and the visual line direction vector data values included in the viewpoint data updated in the process of S103 as explained above.

The indicator data managing section 114 then identifies (S105) the indicator data which is stored in the indicator data storing section 56 and which includes the same user system ID as that of the indicator data generated in the process of S104.

The other-viewpoint data managing section 112 then updates (S106) the indicator data identified in the process of S105 to the indicator data received in the process of S104. This brings the processing of this example to an end.

In this embodiment, every time viewpoint data is received, for example, the processes of S101 to S106 above are carried out.

Figure 21:
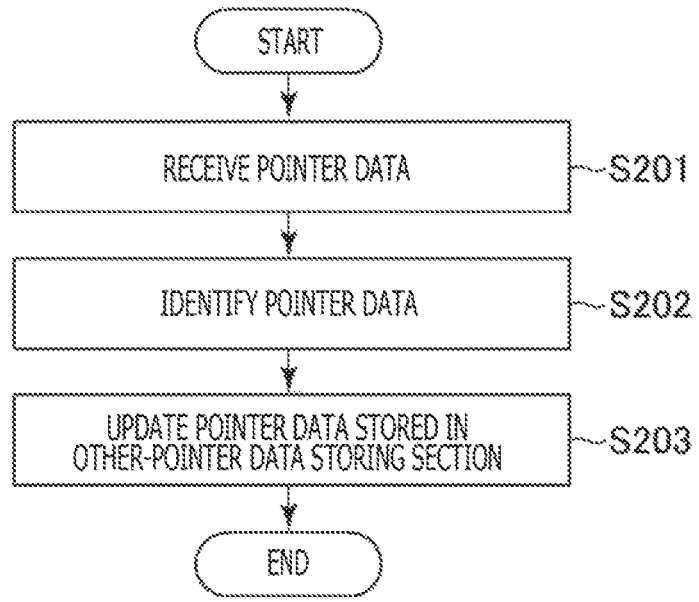
FIG. 21 is a flowchart depicting another typical flow of processing performed by the entertainment apparatus as part of the embodiment of the present invention.

Explained next with reference to the flowchart of FIG. 21 is a typical flow of processing performed by the entertainment apparatus 14 of this embodiment upon receipt of pointer data.

The pointer data receiving section 122 first receives pointer data (S201). In turn, the other-pointer data managing section 124 identifies (S202) the pointer data which is stored in the other-pointer data storing section 100 and which includes the same user system ID as that of the pointer data received in the process of S201.

The other-pointer data managing section 124 updates (S203) the pointer data identified in the process of S202 to the pointer data received in the process of S201.

In this embodiment, every time pointer data is received, for example, the processes of S201 to S203 above are carried out.

Figure 22:
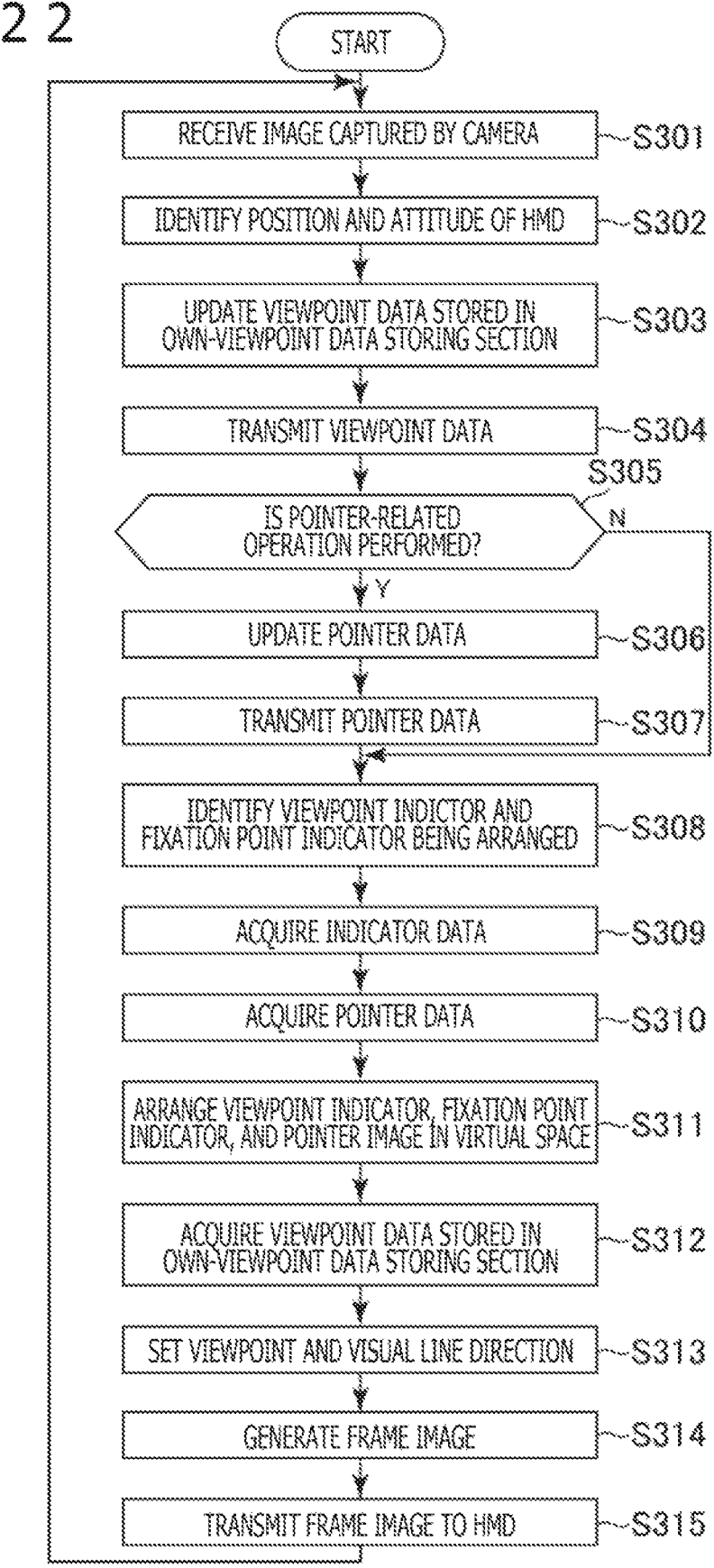
FIG. 22 is a flowchart depicting another typical flow of processing performed by the entertainment apparatus as part of the embodiment of the present invention.

Explained next with reference to the flowchart of FIG. 22 is a typical flow of virtual space display processing performed by the entertainment apparatus 14 of this embodiment.

The captured image receiving section 102 first receives from the camera 20a (S301) an image including that of the HMD 12 captured by the camera 20a. In turn, the position/attitude identifying section 104 identifies (S302) the position and attitude of the HMD 12 on the basis of the image received in the process of S301.

The own-viewpoint data managing section 106 then updates (S303) the viewpoint position data values and the visual line direction vector data values included in the viewpoint data stored in the own-viewpoint data storing section 92, on the basis of the position and attitude of the HMD 12 identified in the process of S302.

The viewpoint data transmitting section 108 then transmits (S304) the viewpoint data updated in the process of S303 to the management system 3. The viewpoint data thus transmitted is in turn sent to the user systems 2 other than this user system 2 and included in the virtual space sharing system 1 (see S101 in FIG. 20).

The pointer operation identifying section 116 then determines (S305) whether any pointer-related operation such as the above-mentioned reset operation, moving operation, or erasing operation is performed.

Suppose now that a pointer-related operation is determined to have beer, performed (S305: Y). In this case, the own-pointer data managing section 118 updates (S306) the texture ID and the pointer position data values included in the pointer data stored in the own-pointer data storing section 98, to the values reflecting the pointer-related operation. The pointer data transmitting section 120 then transmits (S307) the updated pointer data to the management system 3. The pointer data thus transmitted is in turn sent to the user systems 2 other than this user system 2 and included in the virtual space sharing system 1 (see S201 in FIG. 21).

Suppose that no pointer-related operation is determined to be performed (S305: N) in the process of S305 or that the process of S307 is terminated. In that case, the virtual space managing section 126 identifies (S308) the viewpoint indicator 68 and fixation point indicator 70 to be arranged on the basis of the flag values being retained. The virtual space managing section 126 then acquires (S309) from the indicator data storing section 96 the indicator data associated with the viewpoint indicator 68 and fixation point indicator 70 identified in the process of S307.

The virtual space managing section 126 thereafter acquires (S310) the pointer data associated with the pointer image 80 to be arranged, from the own-pointer data storing section 98 and the other-pointer data storing section 100. Here, for example, the pointer data in which the texture ID is 0 and the pointer position data values are (0, 0) is excluded from the target for data acquisition.

The virtual space managing section 126 then arranges (S311) the viewpoint indicator 68, fixation point indicator 70, and pointer image 60 in the virtual space. Here, the viewpoint indicator 68 and fixation point indicator 70 are arranged in a manner reflecting, for example, the indicator data values acquired in the process of S306. Also, the pointer image 80 is arranged in a manner reflecting the pointer data values acquired in the process of S309. Incidentally, it does not matter here whether the positions of any previously arranged objects have been changed. In the case where the pointer data associated with any pointer image 80 previously arranged in the virtual space has yet to be acquired, that pointer image 80 is deleted from the virtual space.

The virtual space managing section 126 then acquires (S312) the viewpoint data stored in the own-viewpoint data storing section 92.

The virtual space managing section 126 thereafter sets (S313), in the virtual space, the position of the viewpoint 64 and the visual line direction 66 on the basis of the viewpoint data acquired in the process of S312. Here, for example, the position of the viewpoint 64 and the visual line direction 66 previously set in the virtual space have already been changed.

The frame image generating section 128 then generates (S314) an image indicating bow things look from the position of the viewpoint 64 in the visual line direction 66, both set in the process of S313. Incidentally, in the process of S314, a two-dimensional image or a three-dimensional image may be generated.

The frame image display controlling section 130 then transmits (S315) the frame image generated in the process of S314 to the HMD 12. Upon receipt of the frame image, the HMD 12 causes the display section 38 to display the received frame image.

In this embodiment, the processes of S301 to S315 are then repeated at predetermined time intervals (e.g., at intervals of 1/60 seconds).

In the above-described example, the pointer data is transmitted every time a pointer-related operation is performed. Alternatively, the pointer data may be transmitted at predetermined time intervals (e.g., at intervals of 1/60 seconds or 5 seconds).

Also in the above example, the viewpoint data is transmitted at predetermined time intervals (e.g., at intervals of 1/60 seconds). Alternatively, the viewpoint data may be transmitted at other different time intervals (e.g., at intervals of 5 seconds).

Also in the example above, a given user system 2 upon receipt of the viewpoint data generates the indicator data associated with the received viewpoint data. Alternatively, the user system 2 may generate the indicator data associated with the viewpoint data. The user system 2 may then transmit the generated indicator to the other user systems 2.

In the example discussed above, the pointer data is shared by the user systems 2. Alternatively, the pointer data may not be shared by the user systems 2.

Also, in the case where the user of a given user system 2 performs a predetermined operation while the pointer image 80 associated that user system 2 is being displayed, the user system 2 may execute a process corresponding to the position where the pointer image 80 is displayed. For example, the user's operation may trigger the process of magnifying a display area cantering on the position where the pointer image 80 is arranged. Described above is the embodiment using a typical virtual space in which the hanging scroll objects 62 are arranged. However, the virtual space for this embodiment is not limited to one in which the hanging scroll objects 62 are arranged. Alternatively, the virtual space for the embodiment may be a virtual space 140 depicted in FIG. 23, for example.

Figure 23:
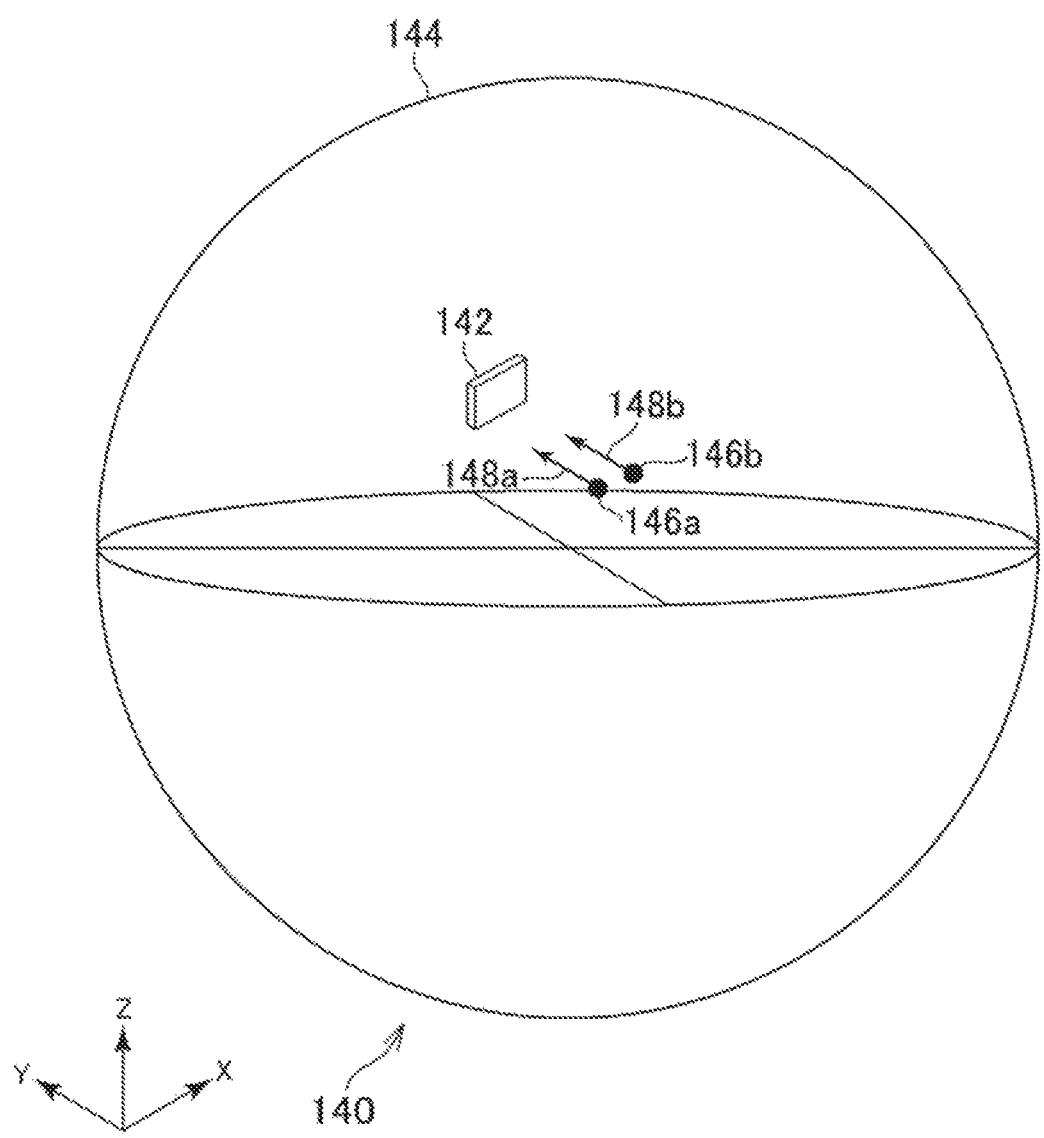
FIG. 23 is a schematic diagram depicting a typical virtual space.

FIG. 23 depicts how the virtual space 140 is shared by the user systems 2-1 and 2-2.

In the virtual space 140 in FIG. 23, there is arranged a screen object 142 constituting a plate-shaped three-dimensional virtual object indicative of a screen. Also in the virtual space 140, a background object 144 is arranged as a spherical virtual object. Incidentally, the radius of the background object 144 may be set to be infinite, for example.

Inside the background object 144 arranged in the virtual space 140 in FIG. 23, a texture image captured by a 360-degree camera is mapped. Incidentally, this texture image may be a moving image recorded in the user systems 2 or a moving image streamed to the user systems 2.

Also, another texture image captured by a camera different from the above-mentioned 360-degree camera is mapped to the screen object 142. This texture image may also be a moving image recorded in the user systems 2 or a moving image streamed to the user systems 2.

It is assumed here that the moving image mapped to the background object 144 is n panoramic video at a stadium where a soccer match is being played. It is also assumed that the moving image mapped to the screen object 142 is a live video of the soccer match being televised.

In the virtual space 140 depicted in FIG. 23, the display section 33 of the HMD 12 in the user system 2-1 displays an image indicating how things look from a viewpoint 146a in a visual line direction 149a inside the background object 144. Also, the display section 36 of the HMD 12 in the user system 2-2 displays an image indicative of how things look from a viewpoint 146b in a visual line direction 148b inside the background object 144.

It is assumed here that a line passing through the viewpoint 146a in the visual line direction 148a intersects with the texture image mapped to the background object 144. It is also assumed that a line passing through the viewpoint 146b in the visual line direction 148b also intersects with the texture image mapped to the background object 144.

Also in the virtual space 140 depicted in FIG. 23, viewpoint indicators and fixation point indicators may be arranged in the manner described above.

Figure 24:
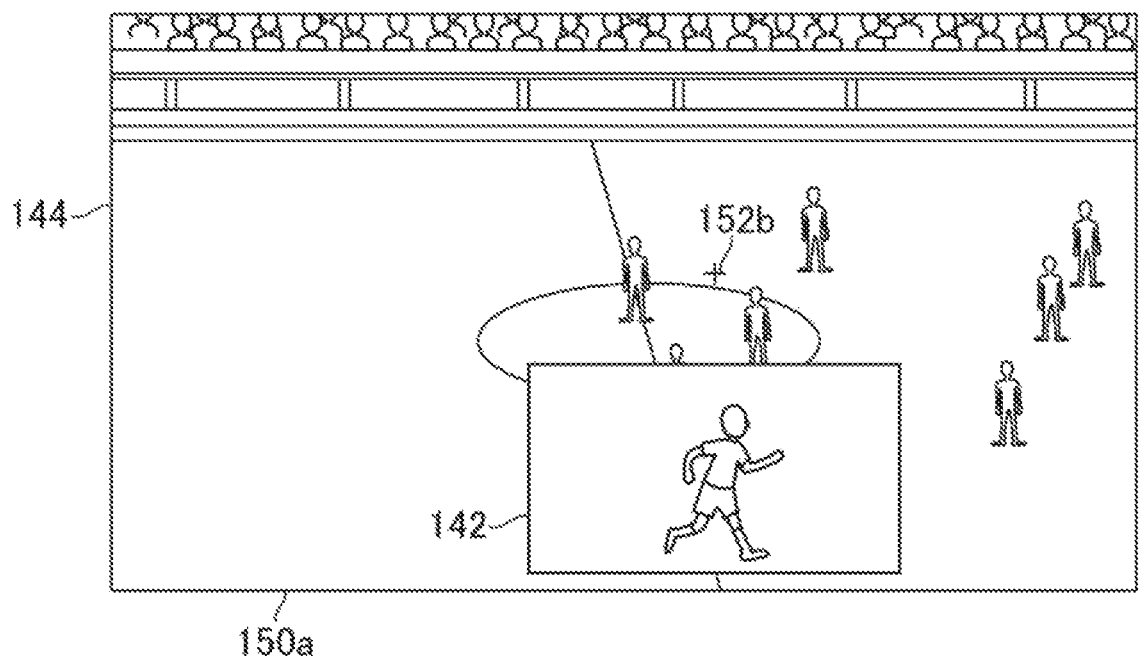
FIG. 24 is a schematic diagram depicting a typical virtual space image.

FIG. 24 depicts a typical virtual space image 150a which is displayed on the display section 38 of the HMD 12 in the user system 2-1 and which indicates how things look from the viewpoint 146a in the visual line direction 148a inside the virtual space 149. The virtual space image 150a in FIG. 24 includes a fixation point indicator 152b indicating the position of the fixation point of the user using the user system 2-2. In the example of FIG. 24, the fixation point indicator 152b is superposed on the texture image mapped to the background object 144. That is because a line passing through the viewpoint 146b in the visual line direction 148b intersects with the texture image mapped to the background object 144.

Figure 25:
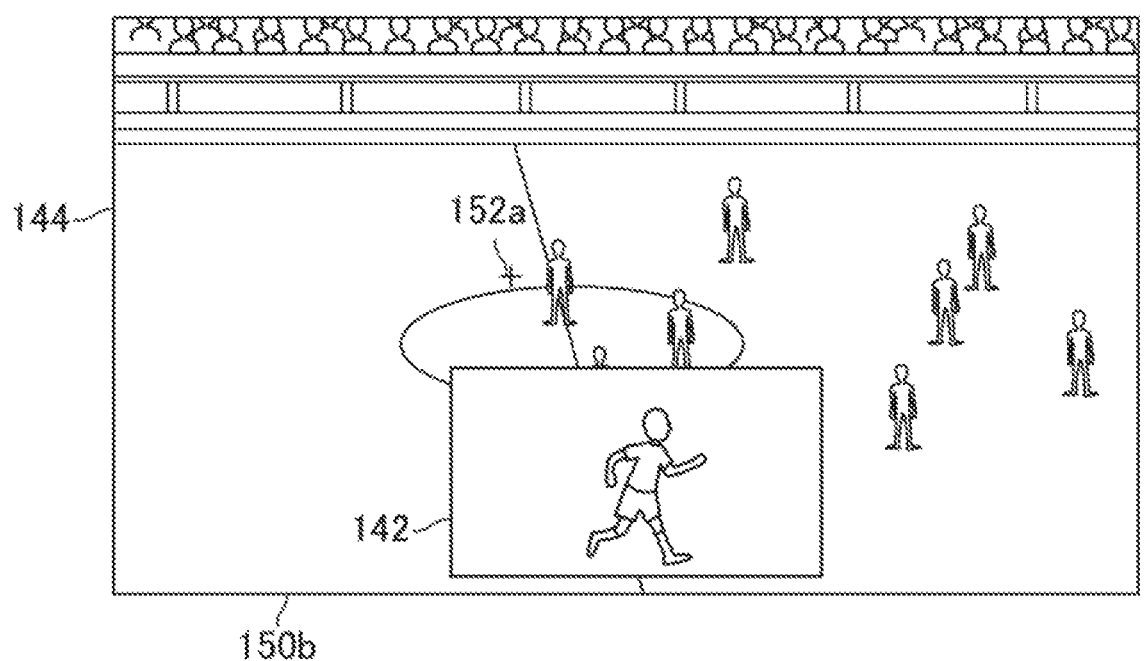
FIG. 25 is a schematic diagram depicting another typical virtual space image.

FIG. 25 depicts a typical virtual space image 150b displayed on the display section 38 of the HMO 12 in the user system 2-2, the virtual space image 150b indicating how things look from the viewpoint 146b in the visual line direction 148b inside the virtual space 340. The virtual space image 150b in FIG. 25 includes a fixation point indicator 152a indicating the position of the fixation point of the user using the user system 2-1. In the example of FIG. 25, the fixation point indicator 152a is superposed on the texture image mapped to the background object 144. That is because a line passing through the viewpoint 146a in the visual line direction 148a intersects with the texture image mapped to the background object 144.

Also in the virtual space 140 depicted in FIG. 22, pointers may be arranged in the same manner described above.

Figure 26:
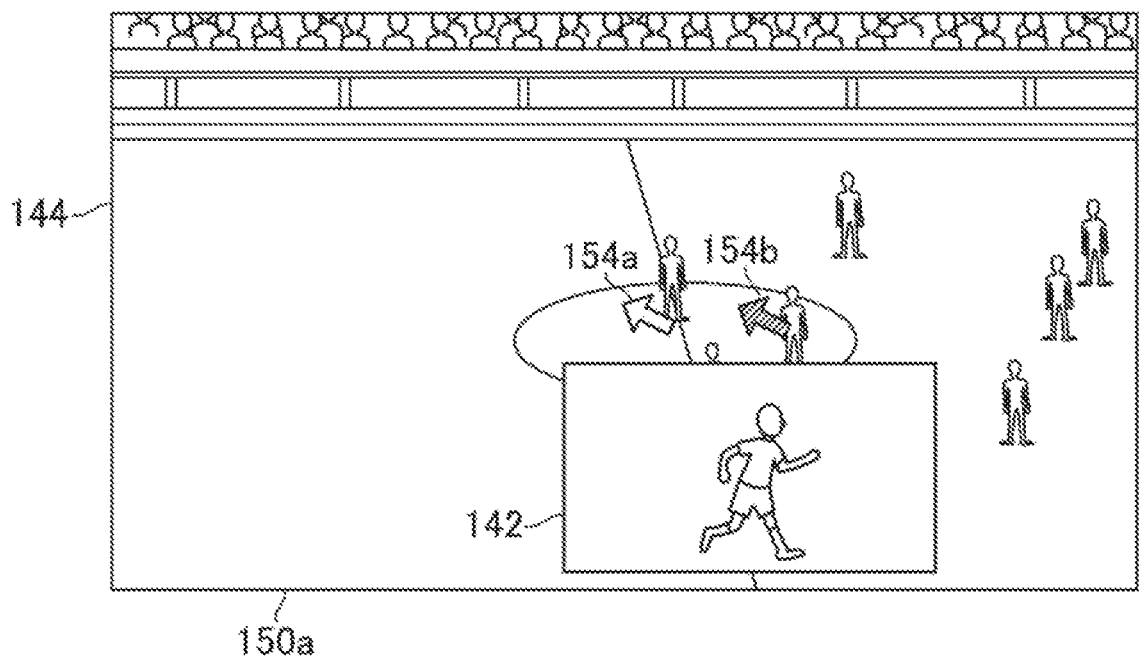
FIG. 26 is a schematic diagram depicting another typical virtual space image.

FIG. 26 depicts another typical virtual space image 150a displayed on the display section 38 of the HMD 12 in the user system 2-1, the virtual space image 150a indicating how things look from the viewpoint 146a in the visual line direction 148a inside the virtual space 140.

Figure 27:
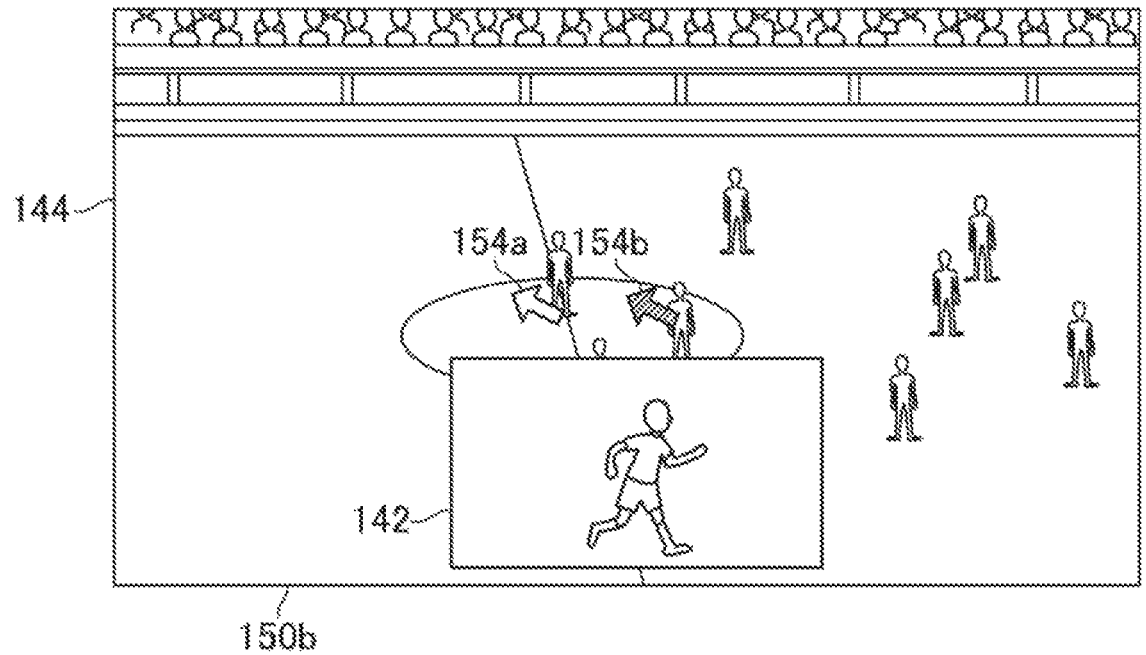
FIG. 27 is a schematic diagram depicting another typical virtual space image.

FIG. 27 depicts another typical virtual space image 150b displayed on the display section 38 of the HMO 12 in the user system 2-2, the virtual space image 150b indicating how things look from the viewpoint 146b in the visual line direction 148b within the virtual space 140.

The virtual space image 150a depicted in FIG. 26 and the virtual space image 150b in FIG. 27 include a pointer image 154a arranged by the user of the user system 2-1 and a pointer image 154b arranged by the user of the user system 2-2. The pointer images 154a and 154b area different in color, so that these images make it possible to identify the user system 2 with which each of the pointer images 154 is associated.

In the examples of FIGS. 26 and 27, the pointer images 154a and 154b are superposed on the texture image mapped to the background object 144. That is because a line passing through the viewpoint 146a in the visual line direction 148a and a line passing through the viewpoint 146b in the visual line direction 146b intersect with the texture image mapped to the background object 144.

Here, the range in which the pointer image 154a is moved and the range in which the pointer image 154b is moved may be limited to over the texture image mapped to the background object 144.

There may be a case where the pointer images 154 are arranged, for example, on the texture image mapped to the screen object 142. In this case, the range in which the pointer images 154 are moved may be likewise limited to over the texture image mapped to the screen object 142.

The position of the screen object 142 may be moved in keeping with the user's operations. Also in each user system 2, the position of the screen object 142 arranged in the virtual space provided by that user system 2 may be movable. Further in each user system, the screen object 342 in the virtual space provided by the user system 2 may be different.

Also, multiple screen objects 142 each displaying a different, video may be arranged in the virtual space.

In this embodiment, the moving images displayed as the texture images by the user systems 2 included in the virtual space sharing system 1 are synchronized with each other. This allows the users of the user systems 2 to enjoy the same video in a synchronized manner.

Further, multiple 360-degree cameras may be used to capture videos from different positions in the stadium. In response to a predetermined operation by the user of a given user system 2, the 360-degree cameras (shooting points) may be switched from one to another to shoot, the video of the texture image napped to the background object 144. At this point, one user may prompt another user by voice to change the shooting points. If the shooting points are switched here not continuously but discontinuously, the users are less likely to suffer from motion sickness watching the video.

Also in this embodiment, the position of the viewpoint 146 and the visual line direction 148 set by the user of a given user system 2 are net affected by the movement of the HMD 12 of any other user. In this manner, the embodiment is designed to reduce the possibility that the users wearing the HMDs 12 suffer from motion sickness.

The moving images mapped to the screen object 142 or to the background object 144 are not limited to those described above. For example, the moving image mapped to the background object 144 may be a video of a starry sky. In this case, the moving image mapped to the screen object 142 may be a background video.

Also in this embodiment, a display area identified by the position or the orientation of the HMD 12 may carry an image with higher resolution than the other areas. For example, a display area of a predetermined size centering on that position in the texture image intersecting with a line passing through the viewpoint 146 in the visual line direction 148 may carry a texture image with higher resolution than the other areas. Also, a texture image with higher resolution than the other texture images may be mapped to an object intersecting with a line passing through the viewpoint 146 in the visual line direction 148, for example.

Furthermore, the texture image mapped to the screen object 142 may have higher resolution than, for example, the texture image mapped to the background object 144.

The present invention is not limited to the embodiments discussed above.

For example, there is no need for the management, system 3 to repeat the transmission and reception of viewpoint data and pointer data. Alternatively, the viewpoint data and pointer data may be exchanged directly between the user systems 2.

The present invention is applicable to both the case where the HMDs 12 communicate with the entertainment apparatus 14 in wired fashion and the case in which the HMDs 12 communicate wirelessly with the entertainment apparatus 14.

It is to be noted that specific character strings and values in the above description as well as in the accompanying drawings are only examples and are not limitative of the present invention.

The invention claimed is:

1. An image generating apparatus comprising:
  a viewpoint object arranging section configured to arrange, using a processor, a viewpoint object indicative of a viewpoint at a first position in a virtual space, the first position being associated with the position of a first head-mounted display;
  a fixation point object arranging section configured to arrange, using the processor, a fixation point object indicative of a fixation point at a position away from the first position in a first visual line direction passing through the first position in the virtual space, the first visual line direction corresponding to the attitude of the first head-mounted display; and an image generating section configured to generate, using the processor, an image indicating how the virtual space appears from a second viewpoint position in a second visual line direction corresponding to the attitude of a second head-mounted display, the second viewpoint being arranged in the virtual space in which both the viewpoint object and the fixation point object are arranged simultaneously, wherein the virtual space includes a virtual object visible by a user wearing the first head-mounted display and by a user wearing the second head-mounted display, wherein the fixation point object arranging section arranges, in the image, the fixation point object as a marker centered at an intersection point between the virtual object and a line passing through the first position in the first visual line direction, and wherein the fixation point object arranging section arranges, in the image, a second fixation point object as a second marker centered at a second intersection point between the virtual object and a line passing through the second viewpoint position and the second virtual line direction.

2. The image generating apparatus according to claim 1, wherein a two-dimensional image is mapped to the virtual object; and the fixation point object arranging section arranges the fixation point object on the two-dimensional image.

3. The image generating apparatus according to claim 1, wherein the fixation point object arranging section arranges a plurality of the fixation point objects and a plurality of viewpoint objects, both associated with a plurality of the head-mounted displays; and the plurality of the fixation point objects allow the associated head-mounted displays to be identified.

4. An image generating method comprising:

arranging a viewpoint object indicative of a viewpoint at a first position in a virtual space, the first position being associated with the position of a first head-mounted display;

arranging a fixation point object indicative of a fixation point at a position away from the first position in a first visual line direction passing through the first position in the virtual space, the first visual line direction corresponding to the attitude of the first head-mounted display;

generating an image indicating how the virtual space appears from a second viewpoint position in a second visual line direction corresponding to the attitude of a second head-mounted display, the second viewpoint being arranged in the virtual space in which both the viewpoint object and the fixation point object are arranged simultaneously, wherein the virtual space includes a virtual object visible by a user wearing the first head-mounted display and by a user wearing the second head-mounted display;

arranging, in the image, the fixation point object as a marker centered at an intersection point between the virtual object and a line passing through the first position in the first visual line direction; and arranging, in the image, a second fixation point object as a second marker centered at a second intersection point between the virtual object and a line passing through the second viewpoint position and the second virtual line direction.

5. A non-transitory computer readable medium having stored thereon a program for causing a computer, the program comprising:

by a viewpoint object arranging section, arranging a viewpoint object indicative of a viewpoint at a first position in a virtual space, the first position being associated with the position of a first head-mounted display;

by a fixation point object arranging section, arranging a fixation point object indicative of a fixation point at a position away from the first position in a first visual line direction passing through the first position in the virtual space, the first visual line direction corresponding to the attitude of the first head-mounted display; and by an image generating section, generating an image indicating how things look from a second viewpoint in a second visual line direction corresponding to the attitude of a second head-mounted display, the second viewpoint being arranged in the virtual space in which both the viewpoint object and the fixation point object are arranged, wherein the virtual space includes a virtual object visible by a user wearing the first head-mounted display and by a user wearing the second head-mounted display, wherein the fixation point object arranging section arranges, in the image, the fixation point object as a marker centered at an intersection point between the virtual object and a line passing through the first position in the first visual line direction, and wherein the fixation point object arranging section arranges, in the image, a second fixation point object as a second marker centered at a second intersection point between the virtual object and a line passing through second viewpoint position and the second virtual line direction.

* * * * *